(12) United States Patent
Krell et al.

(10) Patent No.: US 9,523,542 B2
(45) Date of Patent: Dec. 20, 2016

(54) POLYMERIC COIL ASSEMBLY AND METHOD OF MAKING THE SAME

(71) Applicant: Brentwood Industries, Inc., Reading, PA (US)

(72) Inventors: Timothy E. Krell, Mohrsville, PA (US); Frank M. Kulick, III, Leesport, PA (US); Dean Calton, La Vernia, TX (US)

(73) Assignee: Brentwood Industries, Inc., Reading, PA (US)

( * ) Notice: Subject to any disclaimer, the term of this patent is extended or adjusted under 35 U.S.C. 154(b) by 0 days.

(21) Appl. No.: 14/782,462

(22) PCT Filed: Apr. 4, 2014

(86) PCT No.: PCT/US2014/033086
§ 371 (c)(1),
(2) Date: Oct. 5, 2015

(87) PCT Pub. No.: WO2014/165826
PCT Pub. Date: Oct. 9, 2014

(65) Prior Publication Data
US 2016/0054076 A1 Feb. 25, 2016

Related U.S. Application Data

(60) Provisional application No. 61/819,743, filed on May 6, 2013, provisional application No. 61/808,608, filed on Apr. 4, 2013.

(51) Int. Cl.
*B23P 15/26* (2006.01)
*F28F 9/013* (2006.01)
(Continued)

(52) U.S. Cl.
CPC .............. *F28F 9/0131* (2013.01); *B23P 15/26* (2013.01); *B29C 45/14614* (2013.01);
(Continued)

(58) Field of Classification Search
CPC ...... F28F 9/0131; F28F 9/0224; F28F 9/0219; F28F 9/013; F28F 9/16; F28F 9/162; F28F 2255/143; F28F 2255/146; F28F 21/06; F28F 21/062; F28F 21/067; Y10T 29/4935; B23P 15/26; B29C 45/14614; F28D 1/0477
(Continued)

(56) References Cited

U.S. PATENT DOCUMENTS 2,110,024 A * 3/1938 Miller ...................... F24F 6/04
165/110
2,312,313 A * 3/1943 Beline ..................... F25B 39/02
62/225
(Continued)

FOREIGN PATENT DOCUMENTS

CH 611701 A5 6/1979
EP 1293744 A1 3/2003
(Continued)

OTHER PUBLICATIONS

Written Opinion issued Apr. 28, 2015 in Int'l Application No. PCT/US2014/033086.
(Continued)

*Primary Examiner* — Tho V Duong
(74) *Attorney, Agent, or Firm* — Panitch Schwarze Belisario & Nadel LLP

(57) ABSTRACT

Coil assemblies for use in heat exchange applications are made using polymeric tubes, some with heat exchange and water redistribution media integral with the coil assembly and others with a water distribution subassembly integral with the coil assembly. One coil assembly includes at least two generally linear passes that are connected by return bends formed by folding an array of polymeric tubes. The passes have an array of at least two layers of polymeric tubes that pass through alignment holes in tube spacers only along the passes to maintain the tubes in substantially the same relative positional relationship to each other in the passes and in the return bends. Methods are explained for forming the coil assemblies and components, including the tube spacers and tube sheets to connect the coil assembly to inlet and outlet manifolds for the processing fluid flowing internally through the tubes.

18 Claims, 15 Drawing Sheets

(51) Int. Cl.

| | | |
|---|---|---|
| *F28D 1/047* | (2006.01) | |
| *F28F 9/16* | (2006.01) | |
| *F28F 21/06* | (2006.01) | |
| *B29C 45/14* | (2006.01) | |

(52) U.S. Cl.
CPC ............ *F28D 1/0477* (2013.01); *F28F 9/013* (2013.01); *F28F 9/16* (2013.01); *F28F 9/162* (2013.01); *F28F 21/06* (2013.01); *F28F 21/062* (2013.01); *F28F 21/067* (2013.01)

(58) Field of Classification Search
USPC ................. 165/162, 161, 173, 175, 176, 113
See application file for complete search history.

(56) References Cited

U.S. PATENT DOCUMENTS

| | | | | |
|---|---|---|---|---|
| 3,422,844 | A * | 1/1969 | Grise | F16K 15/147 137/846 |
| 4,117,884 | A * | 10/1978 | Frei | F28F 9/162 165/175 |
| 4,236,574 | A * | 12/1980 | Bosne | F28B 1/06 122/510 |
| 4,643,244 | A | 2/1987 | Bosworth | |
| 4,735,261 | A * | 4/1988 | Huebner | B29C 65/02 165/173 |
| 4,896,410 | A | 1/1990 | Spitzmesser et al. | |
| 5,121,791 | A * | 6/1992 | Casterline | B23P 19/024 165/143 |
| 5,725,047 | A * | 3/1998 | Lopez | F28D 7/08 165/149 |
| 6,101,821 | A * | 8/2000 | Cates | F25D 3/005 62/139 |
| 2003/0192679 | A1* | 10/2003 | Stratman | F28D 5/02 165/115 |
| 2007/0221365 | A1* | 9/2007 | Martin | B21D 7/024 165/150 |
| 2010/0012304 | A1* | 1/2010 | Lee | F28D 1/05333 165/175 |
| 2012/0193080 | A1* | 8/2012 | Rasmussen | F28D 7/06 165/173 |
| 2013/0180696 | A1* | 7/2013 | Magee | F28F 1/00 165/175 |
| 2014/0264973 | A1 | 9/2014 | Aaron et al. | |
| 2014/0264974 | A1 | 9/2014 | Aaron et al. | |

FOREIGN PATENT DOCUMENTS

| | | |
|---|---|---|
| FR | 2180683 A1 | 11/1973 |
| FR | 2267868 A1 | 11/1975 |
| FR | 2793011 A1 | 11/2000 |
| NL | 1035755 C2 | 1/2010 |

OTHER PUBLICATIONS

Int'l Search Report and Written Opinion issued Jul. 7, 2014 in Int'l Application No. PCT/US2014/033086.
Int'l Report on Patentability issued Sep. 9, 2015 in Int'l Application No. PCT/US2014/033086.

* cited by examiner

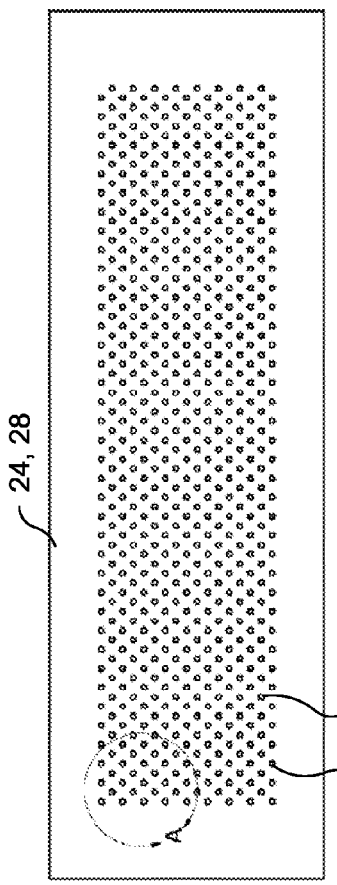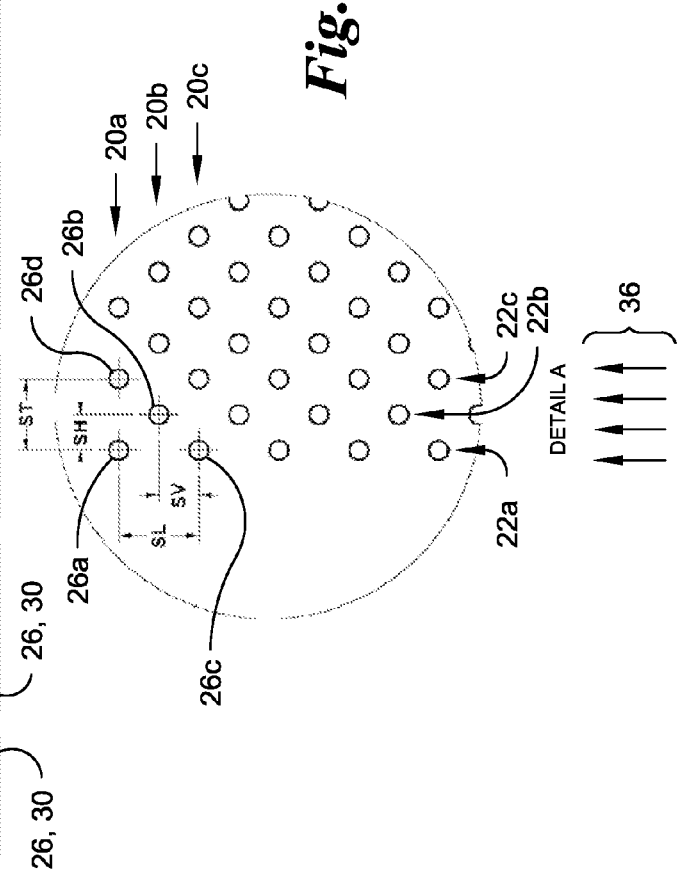

POLYMERIC COIL ASSEMBLY AND METHOD OF MAKING THE SAME

CROSS-REFERENCE TO RELATED APPLICATIONS

This application is an application under 35 U.S.C. §371 of International Application No. PCT/US2014/033086, filed Apr. 4, 2014, which was published in the English language on Oct. 9, 2014, under International Publication No. WO 2014/165826 A1, and also claims the benefit of U.S. Provisional Patent Application No. 61/808,608, filed Apr. 4, 2013, and U.S. Provisional Patent Application No. 61/819,743, filed May 6, 2013. The disclosures in their entirety of the International application and the U.S. Provisional Patent Applications are hereby incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to a coil assembly including tubes made of synthetic polymeric material, rather than metal, such as galvanized steel or stainless steel, referred to hereinafter generally as a "polymeric coil assembly," for use in heat exchange apparatus, particularly evaporative heat exchange apparatus, and to a method of making the polymeric coil assembly. Other aspects of the invention are set forth hereinafter.

The polymeric coil assembly may be used by manufacturers in original heat exchange equipment, typically but not exclusively cooling towers, or as a replacement coil assembly in previously installed heat exchangers. It is particularly useful as a replacement coil assembly in existing installations, since the weight of the polymeric coil assembly is considerably less than the weight of a typical coil assembly made of galvanized steel or stainless steel. For ease of explanation, reference will be made to cooling towers, although the polymeric coil assembly may be used with any other heat exchange equipment where coil assemblies are used for indirect heat exchange between a fluid flowing internally through the tubes of the coil assembly and fluid flowing externally over the tubes in the coil assembly. The coil assemblies of the present invention may be used in systems that operate in wet and dry cooling operations and in closed loop and open loop operations. The polymeric coil assembly may be used in indirect heat exchange systems or together with direct heat transfer media, such as contact bodies that may be splash bars, corrugated synthetic polymer sheets or any other type of direct heat transfer media.

In evaporative heat exchangers using indirect heat transfer provided by coil assemblies, the coil assembly is mounted in a duct or housing in the apparatus in which heat exchange fluids, typically a liquid, usually water, and a gas, usually air, flow externally through the coil assembly to cool or condense a heat transfer fluid passing internally through the tubes of the coil assembly. Coil assemblies, including the polymeric coil assembly of the present invention, may be mounted in a counterflow evaporative heat exchanger so that water flows downwardly and externally through the coil assembly while air travels upwardly and externally through the coil assembly. Coil assemblies, including the polymeric coil assembly of the present invention, also may be mounted in a cross-flow evaporative heat exchanger where the external liquid, usually water, flows downwardly and externally through the coil assembly while the gas, typically air, travels generally transversely across and externally through the coil assembly before reaching a plenum where the air typically exits the top of the apparatus. It is also possible to mount the polymeric coil assembly of the present invention in an evaporative heat exchanger where the external liquid, usually water, and the gas, typically air, flows concurrently or in parallel downwardly and externally through the coil assembly. In any of these arrangements, the evaporation of the water on the external surface of the tubes of the coil cools the coil assembly by conduction and the internal heat transfer fluid inside the tubes by convection.

The water is sprayed by water distribution pipes and nozzles or from troughs where the water flows by gravity over the coil assembly. The water is typically collected in a sump at the bottom of the heat exchanger and recirculated often with makeup water added due to the evaporation to the water distribution system by appropriate pumps through valves in a well-known manner. The air may be inductively drawn into the apparatus and externally through the coil assembly by exhaust fans that are typically propeller fans and then exhausted typically out of the top of the heat exchanger, or the air may be propelled externally through the coil assembly in a forced draft manner by various types of fans, such as centrifugal blowers.

Coil assemblies typically are made from metal tubes that run across the cooling chamber or housing of the evaporative heat exchangers, where the tubes are most often arranged as a series of serpentine tubes including generally straight portions, sometimes called segments, are connected together by bends in the tubing, sometimes referred to as "bights" or as in this application "return bends." The serpentine tubes of the coil assemblies may be packed tightly within the heat exchanger section of the cooling tower with the segments on staggered vertical levels so that the water and air can travel externally through the coil assembly, or the serpentine tubes can be arranged to have some horizontal spacing between the segments on adjacent vertical layers of tubes. There is a trade-off between the power requirement to draw or force air externally through the coil assembly usually against or across the force of water in counterflow and cross-flow arrangements, and the surface area of the tubes in the coil assembly available for heat transfer, which is impacted by the size, number and spacing of the tubes in a coil assembly.

Cooling towers are the most efficient means to reject heat from warm process water used in many applications such as power generation, food processing and HVAC. Closed loop fluid coolers can reject heat from the warm process liquid flowing internally through the tubes indirectly to the outside air stream by transferring heat through the tube walls. Usually fluid cooler heat exchangers are made out of galvanized steel for corrosion purposes from constant exposure to the water spray. However, the galvanizing coating is only on the outside of the tubes. Therefore, circulating water from an open system which is continually aerated will quickly deteriorate the inside of the steel tubing. For this reason, much more expensive stainless steel tubing coils are required for fluid coolers operating in an open system.

Polymeric coil assemblies have been proposed before and have found some success in the market, such as polymeric coil assemblies made and sold by PowerCold Corporation.

The polymeric coils of PowerCold Corporation included a serpentine coil assembly made by folding an elongated bundle of polymeric tubes, but there were issues regarding the heat transfer through the bundle, especially at the return bends. The PowerCold polymeric coil assemblies had tubes that were not spaced regularly in each bundled straight section or "pass," and often were laid against each other in sections between spacers transverse to the longitudinal direction of the pass. The tubes were threaded through holes in the spacers using a steel rod to support the tubes as they were threaded through the holes. The spacers snapped together to form a complete coil row. Additionally, a rod was inserted through the assembled spacers to attach and support an external frame structure. The tube bundle was split into two groups of thirty tubes per bundle per pass. At each return bend, the top bundle of tubes in the pass switched with the lower bundle of tubes in the pass to minimize the tube bend and prevent kinking. The return bends were bundled, taped or twisted together, in effect preventing or severely restricting the external flow of air and water through the return bends and losing significant heat transfer capacity at the return bends. The bundles of the tubes transitioned at their ends from a square or rectangular spacing pattern into a round tube pattern, since the ends of the tubes were sonically welded into a round tube sheet to fit into a standard polyvinyl chloride (PVC) pipe union. The polymeric coil assembly of the present invention overcomes the problems associated with the PowerCold polymeric tube assembly.

The polymeric coil assembly of the present invention provides a maximum amount of coil heat transfer surface area within a given coil assembly volume, enhancing heat transfer capacity, with significantly less weight than a metal coil assembly of the same dimensions. The polymeric tubing used in the polymeric coil assembly is less prone to corrosion than galvanized steel coil assemblies. Compared to prior art polymeric coil assemblies, the polymeric coil assembly of the present invention avoids bundling of the tubes in the passes and bundling, taping or twisting of the tubes at the bends, but instead provides appropriate spacing of the tubes such that they minimize sagging and maintain substantially the same relative positional relationship to each other in the passes and in the return bends. This enhances heat transfer capacity and efficacy.

A method of making the polymeric coil assembly is part of the invention. The method assures that the tubes in the array maintain substantially the same relative positional relationship to each other in the passes and in the return bends.

Another part of the invention concerns making any type of coil assembly of polymeric tubes and forming tube sheets around the ends of the tubes by injection molding, casting or potting. This method is more efficient than threading the polymeric tube ends through alignment holes in the tube sheets that connect the tubes to manifolds for heat transfer fluid to flow internally through the tubes in the coil assembly.

Similarly, the invention also includes a method for forming spacers around polymeric tubes in any type of coil assembly by a casting or potting the spacers, of which there are usually many, around the tubes, again avoiding the need to thread the tubes through many spacers.

Cooling towers are known that separately include both coil assemblies and direct contact evaporative heat exchange fill media in the heat exchanger housing. Another part of the present invention is to combine direct contact evaporative heat exchange fill media into a coil assembly for purposes of at least one of enhancing heat exchange characteristics, water redistribution over at least one section of tubular coils and to support adjacent passes of the coils.

Evaporative cooling towers also use water distribution systems that typically include nozzles to spray water upon coil assemblies and/or direct contact air/water evaporative fill media. The water distributors are separate parts of the heat exchange apparatus. Another aspect of this invention is the integration of a water distribution subassembly within a coil assembly of polymeric tubes of any construction. By incorporating a water distribution subassembly integrally in a coil assembly the water can be distributed precisely where it is intended for a particular application.

BRIEF SUMMARY OF THE INVENTION

One aspect of the present invention relates to a coil assembly that comprises an array of polymeric tubes arranged along a pathway including at least two generally linear passes extending for a predetermined longitudinal distance, where the array of tubes extends between the passes by way of one return bend between each two passes. The array of tubes in each pass comprises at least two generally parallel layers of tubes having substantially the same relative positional relationship to each other in the passes and in the return bends. The array of tubes extends through a plurality of alignment holes in a plurality of tube spacers oriented transversely along the longitudinal distance of the passes. The spacers are of a sufficient number and spacing from each other along only the longitudinal distance of the passes to support and maintain the tubes in their relative positional relationship in the passes and in the return bends.

Another aspect of the present invention relates to a method of making a coil assembly for use in heat exchange applications, the coil assembly comprising: an array of polymeric tubes extending from a first tube sheet through a plurality of alignment holes in a plurality of tube spacers to a second tube sheet, each tube in the array having a first end and a second end; the array of tubes extending from the first tube sheet to the second tube sheet along a serpentine pathway including at least two generally linear passes extending for a predetermined longitudinal distance, where the array of tubes extends between the passes by way of one return bend between each two passes; the array of tubes in each pass comprising at least two generally parallel layers of tubes; the tubes maintaining their relative positional relationship to each other in the passes and in the return bends; the spacers being oriented transversely along the longitudinal distance of the passes; and the spacers being of a sufficient number and spacing from each other along the longitudinal distance of the passes to support and maintain the tubes in their relative positional relationship in the passes and in the return bends; the method comprising:

(a) providing the array of the polymeric tubes, first and second tube sheets, and a plurality of the tube spacers, where the array of tubes is initially in an extended linear pathway;

(b) locating the tubes in the spacers such that the tubes are in the alignment holes in the spacers;

(c) aligning the tubes at the first end within the first tube sheet so that fluid can flow internally through the tubes;

(d) aligning the tubes at the second end within the second tube sheet so that fluid can flow internally through the tubes; and (e) folding the array of tubes from the initial extended linear pathway to form the serpentine pathway having the linear passes and at least one return bend, such that the relative positional relationship of the tubes with respect to each other is maintained in the passes and in the return bends.

Another aspect of the present invention relates to a method of making a coil assembly for use in heat exchange applications, the coil assembly comprising an array of polymeric tubes extending from a first tube sheet through a plurality of alignment holes in a plurality of tube spacers to a second tube sheet, each tube in the array having a first end and a second end, the array of tubes comprising at least two generally parallel layers of tubes, the spacers being oriented transversely along a longitudinal distance between the first and second tube sheets, the spacers being of a sufficient number and spacing from each other along a longitudinal distance between the tube sheets; the method comprising:

(a)(5) providing the array of the polymeric tubes, the first and second tube sheets, and a plurality of the tube spacers;

(b)(5) locating the tubes in the spacers such that the tubes are in the alignment holes in the spacers;

(c)(5) aligning the tubes at the first ends within the first tube sheet so that fluid can flow internally through the tubes;

(d)(5) aligning the tubes at the second ends within the second tube sheet so that fluid can flow internally through the tubes; and (e)(5) forming tube sheets around the ends of the tubes by injection molding, casting or potting.

Yet another aspect of the present invention relates to a coil assembly for use in heat exchange applications, the coil assembly comprising an array of polymeric tubes including at least two generally linear passes of at least two layers of tubes extending for a predetermined longitudinal distance, and heat exchange and water redistribution media between at least two passes of the coil assembly.

Still another aspect of the present invention relates to a coil assembly for use in heat exchange applications, the coil assembly comprising an array of polymeric tubes including at least two generally linear passes of at least two layers of tubes extending for a predetermined longitudinal distance, the coil assembly further comprising a water distribution subassembly integrally included within the coil assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 7 is a front elevation view of one exemplary embodiment of a tube sheet or a spacer in the polymeric coil assembly of the present invention;

FIG. 7A is an enlarged detail of the tube sheet or spacer of FIG. 7 in the area "A" showing exemplary spacing of tube alignment holes in an embodiment where the tube alignment holes are vertically staggered with respect to adjacent horizontal layers when the coil assembly is used in a counterflow evaporative heat exchanger where the air direction is upwards in the orientation of the coil assembly as illustrated;

DEFINITIONS

Figure 1:
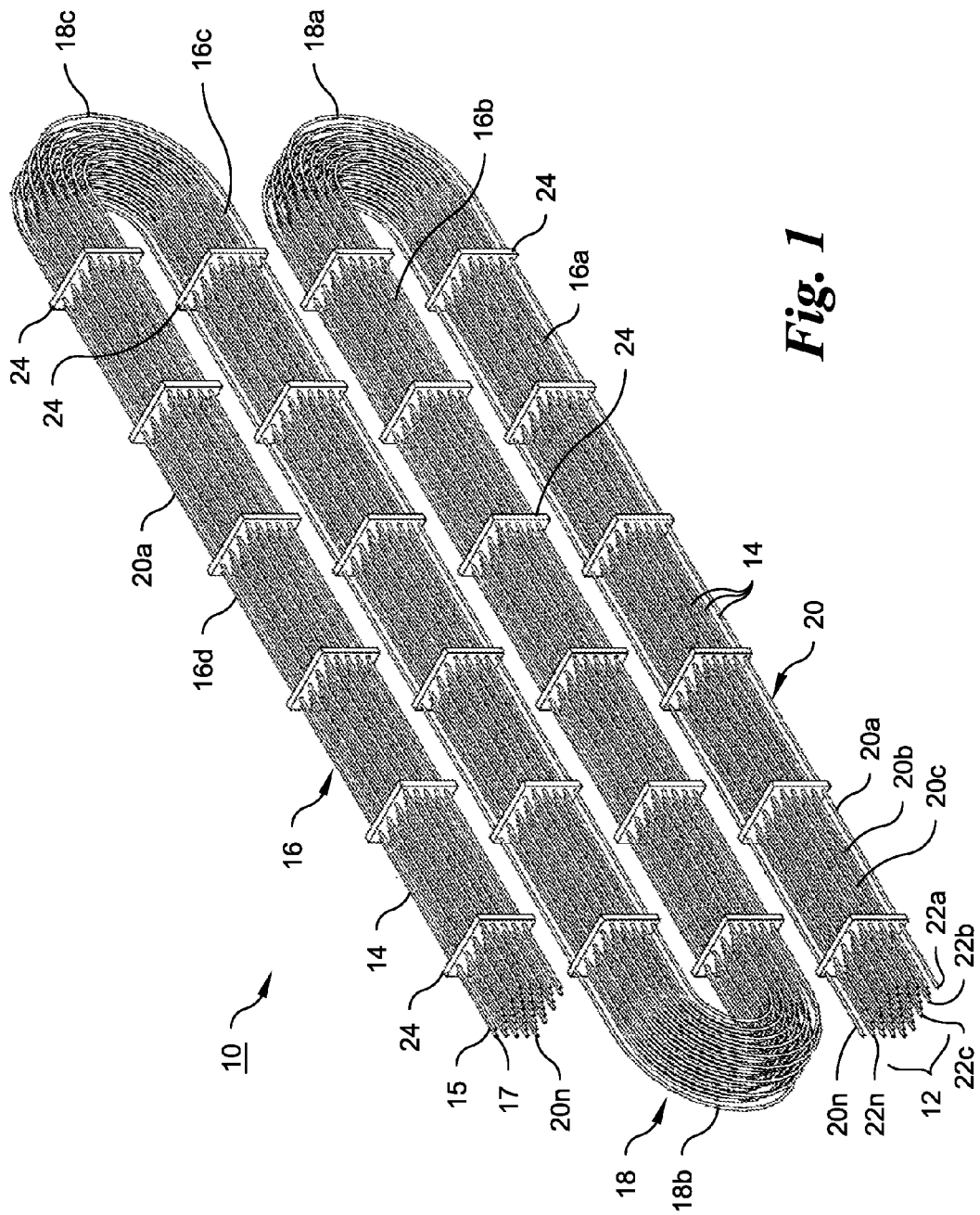
FIG. 1 is an isometric view of one exemplary embodiment of a polymeric coil assembly according to the present invention, showing one embodiment of the relative positional relationship of the tubes of the coil assembly maintained with respect to each other in the passes and the return bends.

In addition to the definitions set forth elsewhere herein, the following definitions relate to the invention described and claimed in this application.

As used herein, the singular forms "a", "an", and "the" include plural referents, and plural forms include the singular referent unless the context clearly dictates otherwise.

Certain terminology is used in the following description for convenience only and is not limiting. Words designating direction such as "bottom," "top," "front," "back," "left," "right" "upper," "lower" and "sides" designate directions in the drawings to which reference is made, but are not limiting with respect to the orientation in which the polymeric coil assembly of the present invention and its components and apparatus used to make it or its components may be used. The terminology includes the words specifically mentioned above, derivatives thereof and words of similar import.

As used herein, the term "about" with respect to any numerical value, means that the numerical value has some reasonable leeway and is not critical to the function or operation of the component being described or the system or subsystem with which the component is used, and will include values within plus or minus 10% of the stated value.

As used herein, the term "generally" or derivatives thereof with respect to any element or parameter means that the element has the basic shape, or the parameter has the same basic direction, orientation or the like to the extent that the function of the element or parameter would not be materially adversely affected by somewhat of a change in the element or parameter. By way of example and not limitation, the passes being "generally linear" refers to the passes not being exactly straight, particularly when filled with water or other internal heat transfer liquid, but extending in a reasonably straight direction, or a cross-section of a tube or forming component of an apparatus as being "generally oval" refers not only to a cross-section of a true mathematical oval, but also to elliptical cross-sections or somewhat squared corner cross-sections, or the like, but not a circular cross-section or a rectangular cross-section. Similarly, an element that may be described as "generally perpendicular to" or "generally parallel to" another element can be oriented a few degrees more or less than exactly 90° with respect to "generally perpendicular" and a few degrees more or less than exactly perfectly parallel or 0° with respect to "generally parallel," where such variations do not materially adversely affect the function of the polymer coil assembly, component thereof or the apparatus used to form the product or its components.

As used herein, the term "substantially" with respect to any numerical value or description of any element or parameter, including the relationship of the tubes with respect to each other in the polymeric coil assembly, means sufficiently close to the precise value, parameter or relationship to be within reasonable industrial manufacturing tolerances and use conditions that would not adversely affect the function of the element or parameter or apparatus containing it. By way of example and not limitation, "tubes having substantially the same relative positional relationship to each other in the passes and in the return bends" expresses that even if the tubes are not exactly in the same positional relationship throughout their length or around the return bends, the tubes do not cross over each other, or if in a spaced relationship, maintain a spaced relationship preferably without touching each other, yet allowing variations in manufacturing and use conditions that would not materially adversely affect performance, such that water or air flowing externally through the polymeric coil assembly would not be materially impeded or otherwise affected so as to meaningfully reduce thermal performance of an evaporative heat exchanger using the polymeric coil assembly of the present invention.

As used herein, a first element or member is "transverse" with respect to a second element or member if it generally goes across the general longitudinal axis of the second element or member, rather than necessarily being exactly perpendicular to the second element or member.

As used herein, where specific dimensions are presented in inches or other English units and parenthetically in millimeters (mm) or other metric units, the dimensions in English units controls, as the metric unit equivalents are converted from the English units; for example, the millimeter dimensions were calculated based on the inches dimensions by multiplying the inches dimensions by a factor of 254 mm per inch and rounding the millimeter dimensions to no more than three decimal places.

DETAILED DESCRIPTION OF THE INVENTION

Figure 2:
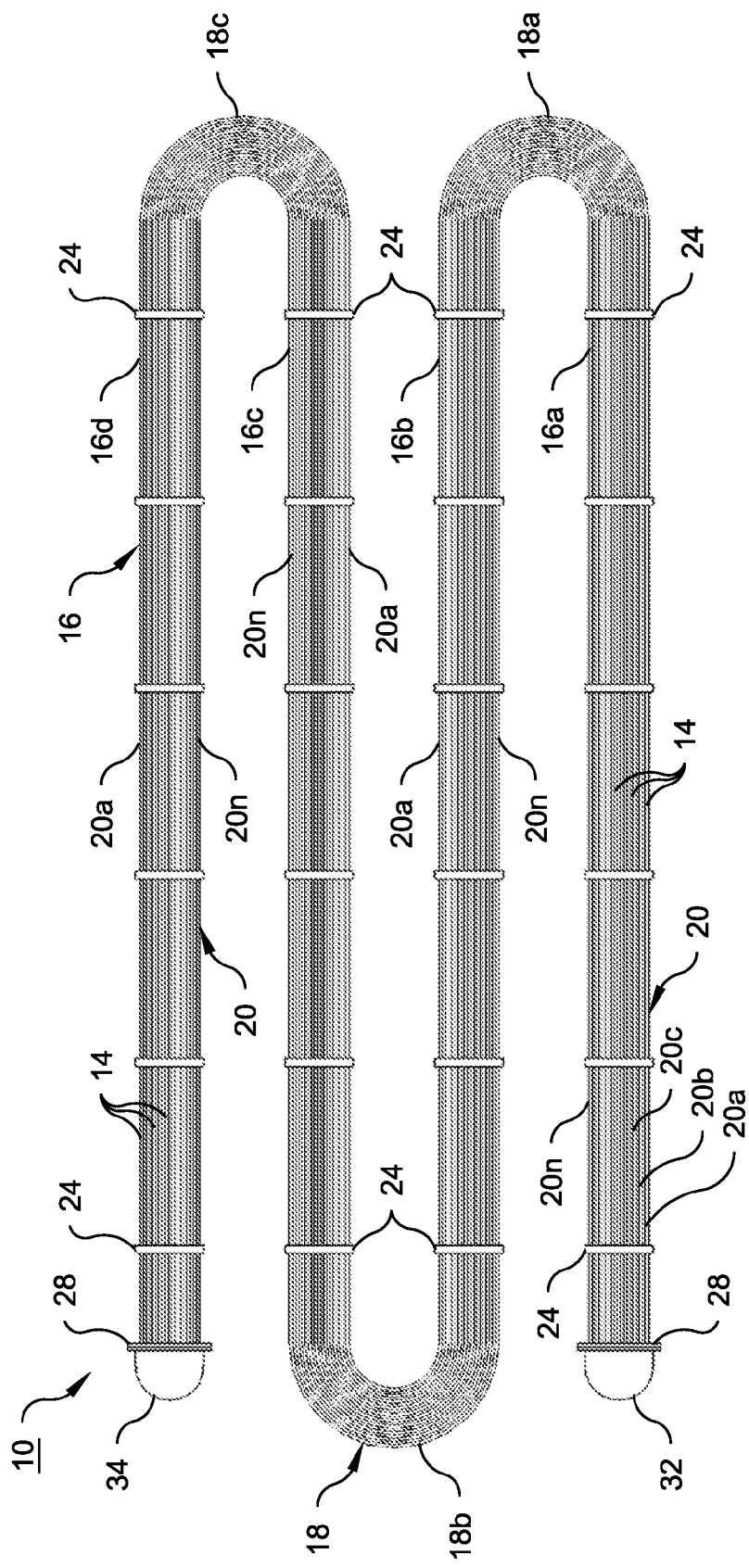
FIG. 2 is a front elevation view of the embodiment of the polymeric coil assembly of FIG. 1 with tube sheets and manifold schematically illustrated as attached at the ends of the tubes forming the coil assembly.

With reference initially to FIGS. 1 and 2, one embodiment according to an aspect of the present invention is illustrated as a coil assembly 10 that comprises an array 12 of polymeric tubes 14 arranged along a pathway including at least two generally linear passes 16, such as the lowest pass 16*a*, intermediate passes 16*b* and 16*c*, and a top pass 16*d*. Any number of passes 16 may be used in the coil assembly 10, as determined by space within the heat exchange apparatus in which the coil assembly 10 is used and the heat transfer capacity required for any of a great many types of heat exchange purposes of any given nature. The passes extend for a predetermined longitudinal distance determined by space limitations in the heat exchange apparatus. The array 12 of tubes 14 extends between the passes 16 by way of one return bend 18 between each two passes 16. In other words, the return bends 18 connect the passes 16, such as the return bend 18*a* connects the passes 16*a* and 16*b*, the return bend 18*b* connects the passes 16*b* and 16*c*, and the return bend 18*c* connects the passes 16*c* and 16*d*. As a result of the passes being connected by the return bends, the array 12 of tubes 14 is formed into a serpentine pathway.

The array of tubes in each pass 16 comprises at least two generally parallel layers 20 of tubes 14, shown in the orientation of the coil assembly 10 in FIG. 2 as being generally horizontal rows or layers 20, depicted by layers 20*a*, 20*b*, 20*c*, etc. up to 20*n*, where "n" is any number suitable for the space available and the heat transfer requirements for the coil assembly. Each pass 16 can have as few as two layers 20 of tubes 14 and as many as desired, for example without limitation four, ten, twelve or fourteen layers up to about twenty layers, although the more layers 20*a*-20*n* there are in each pass 16, the more difficult it is to form the coil assembly 10 as a serpentine pathway from the array 12 of tubes 14.

For example, a coil assembly with multiple passes 16 for use in a counter flow heat exchanger will produce more efficient heat transfer. Increasing the number of passes increases the efficiency but each additional pass has diminishing improvement. Four is the generally accepted optimum number of passes if having varying lengths of tubes is less of a concern. It would be better to keep the number of passes 16 to four and increase the number of tube layers 20 per pass to increase capacity for a given cabinet size. This design allows for variable tube layers. As an example, a fluid cooler 12 feet (3.66 m) in length and with four passes 16 would have tube lengths in excess of 48 feet (14.63 m) to account for the additional length around the return bends and would be folded three times.

Likewise, any number of tubes 14 may be present in any given layer 20, where the number of such tubes in each layer 20 defines the number of columns 22, such as 22*a*, 22*b*, 22*c*, etc. up to 22*n* in each pass 16 of the array 12. An exemplary pass 16 may have seventeen layers 20 and seventy-six columns, for instance (with reference to the number of tubes aligned within the spacer 24 of FIG. 7). As noted above, there is a tradeoff in any coil assembly between thermal performance in view of the power of the fans needed to draw or force air externally through the coil assembly, blocking or damming of water between and among the tubes (e.g., flooding) and the number of tubes of the array, the size, spacing and orientation of the tubes, and the like, as well as the ease or difficulty, and therefore the cost of manufacturing the coil assembly.

Although four passes 16 are shown in the exemplary drawings for ease of illustration, there can be any number of passes in the coil assembly 10 as dictated by the space in the heat exchange apparatus in which the coil assembly is used and the heat transfer requirements of the coil assembly. An odd number of passes greater than two is preferred, so that the length of the tubes 14 can be uniform, taking into account the difference in length of the tubes caused by the greater length of travel of the tubes on the outside of the return bends. See, for example FIGS. 1 to 3, and especially FIGS. 2 and 3, where the tubes 14 in layer 20a have a greater length of travel around the outside of return bends 18a and 18c than the length of travel of the tubes 14 in layer 20n, around the inside of both return bends 18a and 18c. If there were another pass, then the tubes of layer 20a and the tubes of layer 20n would travel on the outside and the inside of the same number of return bends, since there is an even number of return bends 18 for an odd number of passes 16.

For this first embodiment, it is important that the tubes 14 of the array 12 maintain substantially the same relative positional relationship to each other in the passes 16 and in the return bends 18 to maximize the heat transfer ability of the coil assembly. If the tubes 14 press against each other or cross each other, which occurred in prior polymeric coil assemblies, where the tubes appeared to be almost braided in the return bends and where adequate spacing was not controlled in the passes, heat transfer ability and capacity are meaningfully adversely affected. If the relative positional relationship of the tubes 14 with respect to each other is not maintained or retained, excessive power to drive the fans drawing or forcing air externally through the coil assembly is also necessary, driving up the initial cost for more powerful motors and the operating cost that is more for motors of greater power. Although most of the heat transfer occurs in the passes 16, a relatively small but meaningful amount of heat transfer can occur in the return bends 18 if they are not occluded as a result of the need to fold the array 12 of tubes in this embodiment to form the serpentine pathway of the coil assembly.

The tubes 14 are maintained substantially in their relative positional relationship in the passes 16 and in the return bends 18 in this first embodiment of the invention by the use of a sufficient number of tube spacers 24 along only the longitudinal distance of the passes 16. The distance, that is, the space between adjacent tube spacers 24 must also be controlled along only the longitudinal distance of the passes. Tube spacers 24 should not be used at the return bends 18, because doing so will adversely affect air and water flow through the return bends, but the spacers 24 must be positioned sufficiently close to the return bends 18 to support the tubes 14 so as to maintain substantially the same relative positional relationship of the tubes 14 in the return bends 18 as in the passes 16. The actual spacing between adjacent spacers 24 along the passes 16 may be determined empirically, taking into account the size, number and spacing of the tubes 14, the material used to make the tubes, and the anticipated weight of the fluid, typically a liquid, passing internally through the tubes 14 in the coil assembly.

The array of tubes 14 extends through a plurality of alignment holes 26 in a plurality of the tube spacers 24 oriented transversely along the longitudinal distance of the passes 16. The spacers are of a sufficient number and spacing from each other along only the longitudinal distance of the passes to support and maintain the tubes in their relative positional relationship in the passes 16 and in the return bends 18.

The placement of the spacers 24 along the array must account for the different locations along the length of the passes based on the tubes having different lengths as they round the return bends, even if the tubes having the same overall length can be used for an odd number of passes as mentioned above. For example, in a four pass coil assembly, the layer 20a has a greater length than layer 20n, due to layer 20a having to go around the outside of more return bends than the layer 20n. This means that the tube sheets 28 (described below) and the tube spacers 24 cannot be firmly locked onto the tubes in the passes until the serpentine shape is formed or when applying spacers and folding the coil to make the return bends. The tubes have to be free to move through both the tube sheets 28 and tube spacers 24 to allow for the varied tube length increase at each return bend for the respective layers. An optional method would be to calculate the distance between spacers for each layer taking into account their relative position in the final stacked layered assembly.

Although the spacers 24 can be located anywhere along the longitudinal distance of the passes 16 to support the tubes, such variable spacing may have consequences. Staggered vertical spacing of the spacers on adjacent passes may help distribute water more evenly over the exterior of the tubes of the coil assembly and enhance heat transfer. However, a staggered arrangement may not be as beneficial to support the passes and tube sheets within the coil assembly. For enhanced support, with minimal effect on heat transfer, it is preferred that the tube spacers 24 be in vertical alignment on adjacent pass levels.

The tubes 14 have end portions 15 with open ends 17 through which internal heat transfer fluid passes internally through the tubes 14 of the array 12 and the coil assembly 10. The end portions 15 and ends 17 of the tubes 14 are retained in tube sheets 28, which retain the same general positional relationship of the tubes with respect to each other as in the passes 16 when the tubes pass through the alignment holes 26 in the tube spacers 24. For the sake of convenience, FIG. 7 depicts the same component as a tube spacer 24 with its alignment holes 26 and as a tube sheet 28 with its alignment holes 30. The tube spacers 24 and the tube sheets 28 may have the same transverse areas, but is it usually preferred that the transverse area of the spacers 24 is larger than the transverse area of the tube sheets 28, where the alignment holes 26 for the tubes passing through the spacers 24 are spaced at greater distances from each other compared to the distance between the alignment holes 30 of the tube sheets 28, but the alignment holes 26 and 30 are in the same orientation within both the spacers 24 and the tube sheets 28 to retain generally the same relative positional relationship of the tubes to each other, but only closer in the tube sheets, to minimize and preferably avoid twisting and undesirable contact of the tubes 14. By having tube sheets with a smaller transverse area than the spacers, the tube sheets may be connected to smaller manifolds 32, 34 sometimes referred to as headers, which take up less space in the heat exchange apparatus.

The manifolds serve as a first, or typically an outlet manifold 32 that is connected to a first tube sheet 24, in turn connected to first tube end portions 15 and first ends 17 at the lowest pass 16a of the coil assembly 10, and as a second, or typically an inlet manifold 34 that is connected to a second tube sheet 24, in turn connected to second tube end portions 15 and first ends 17 at the top pass 16d of the coil assembly 10. The manifolds 32 and 34 are in fluid connection with conduits that in turn are in fluid connection with the apparatus that uses the process fluid passing internally through the tubes 14 of the coil assembly 10.

The tubes 14 of the coil assembly are polymeric tubes, that is, tubes made of a synthetic polymer. Polymeric tubes are well known for use as tubes in heat exchange coils. While the use of polymeric tubes is not as common as the use of metal tubes as described in the Background section above, polymeric tubes are generally less expensive, relatively easy to work with and above all, weigh considerably less than metal tubes more typically used for heat exchange applications. The polymeric tubes still must have adequate ability to transfer heat, typically from a warmer fluid inside the tubes to the cooling flow of air and water outside of the tubes, and must be durable for the intended environment of the coil assemblies using them. Polymeric tubes also have the benefit of non-corrosive tube surfaces. The flexibility of them) having the characteristics noted herein, for example, polyamide, polyimide and PVC. Currently, the preferred polymer for the polymeric tubes 14 is a polyamide, and more preferably nylon, such as nylon 6, nylon 12, nylon 6-12 or nylon 10-12.

While Table 1 above lists tubes having convenient outside diameters (OD), tubes 14 having other ODs would be suitable for tubes 14. The following Table 2 lists exemplary tubes by OD, inside diameter (ID) and wall thickness for readily available nylon 6 tubing, all of which have a very suitable burst pressure of 280 pounds/square inch (psi) (1,930.5 kilopascals (/KPa)): Tough polymers, such as polyamides, can allow the tube wall thickness to be minimal to support the operating fluid pressure which can be as high as 125 PSIG. The lower the operating pressure, the thinner the tubing material can be for a given operating pressure.

TABLE 2

| OD sixteenth inch | 2 | 3 | 4 | 5 | 6 |
|---|---|---|---|---|---|
| Wall thickness inch (mm) | 0.005 (0.127) | 0.0075 (0.191) | 0.010 (0.254) | 0.0125 (0.318) | 0.015 (0.381) |
| OD inch (mm) | 0.125 (3.175) | 0.1875 (4.763) | 0.25 (6.350) | 0.3125 (7.938) | 0.375 (9.525) |
| ID inch (mm) | 0.115 (2.921) | 0.1725 (4.382) | 0.230 (5.842) | 0.2875 (7.303) | 0.345 (8.763) |
| OD sixteenth inch | 7 | 8 | 9 | 10 | 11 |
| Wall thickness inch (mm) | 0.0175 (0.445) | 0.020 (0.508) | 0.02250 (0.572) | 0.02500 (0.635) | 0.0275 (0.699) |
| OD inch (mm) | 0.4375 (11.113) | 0.5 (12.700) | 0.5625 (14.288) | 0.625 (15.875) | 0.6875 (17.463) |
| ID inch (mm) | 0.4025 (10.224) | 0.460 (11.684) | 0.5175 (13.145) | 0.5750 (14.605) | 0.6325 (16.066) |
| OD sixteenth inch | 12 | | | | |
| Wall thickness inch (mm) | 0.0300 (0.762) | | | | |
| OD | 0.75 (19.050) | | | | |
| ID | 0.69 (17.526) | | | | | the tubes is also a factor, as the tubes must be flexible enough to form the return bends 18 without kinking, but strong enough to maintain their structural integrity individually and within the array 12 of the coil assembly, under use conditions, including when they are filled internally with the heat transfer fluid, typically a liquid, and upon being subjected to the considerable external forces of air and water usually traveling in a countercurrent or cross-flow manner. Since polymeric tubes have less heat transfer ability than metal tubes, much more surface area is required over the traditional steel tube coil. Thus, the polymeric coil assembly of this invention has greater surface area by using a greater number of polymeric tubes than metal tube coil assemblies. For example, when using 646 polymeric tubes (a fairly typical amount, although the number of tubes used varies greatly depending on the specific application) in the coil assembly of this invention, surface areas like the following in Table 1 can be achieved, where the tube diameter as stated is without limitation:

TABLE 1

| Tube Outside Diameter (OD) | Surface Area |
|---|---|
| 0.125 inch (3.175 mm) | 45.8 ft$^2$/cubic feet (150.5 m$^2$/m$^3$) |
| 0.1875 inch (4.763 mm) | 29.2 ft$^2$/cubic feet (95.8 m$^2$/m$^3$) |
| 0.25 inch (3.465 mm) | 22.9 ft$^2$/cubic feet (75.3 m$^2$/m$^3$) |
| 0.375 inch (2.332 mm) | 14.1 ft$^2$/cubic feet (46.4 m$^2$/m$^3$) |

The tubes may be made of any number of polymers (including copolymers, terpolymers, etc., and blends of The number of tubes 14 used in an array 12 for the coil assembly 10 varies greatly, depending on the intended use, including size limitations of the heat exchange apparatus in which the coil is used, tube size and spacing, heat transfer requirements, etc. Typically and without limitation, 646 tubes 14 of 0.1875 inch (4.763 mm) OD may be arranged in 17 layers 20 and 38 columns 22, for instance.

The tube spacers 24 and the tube sheets 28 may be made of any suitable corrosion-resistant material that has sufficient structural integrity when holes are formed therein, especially for the spacers 24 to support the tubes 14 within the array even when the tubes are filled with a liquid and subjected to the stresses imposed by air and water traveling externally through the coil assembly, to substantially maintain the relative positional relationship of the tubes to each other in the passes 16 and the return bends 18. Appropriate materials for the spacers 24 and the tube sheets 28 are, for example acrylonitrile-butadiene-styrene (ABS), acrylic, nylon, polypropylene, polyoxymethylene, and PVC. Strong, stable polymeric materials such as ABS, are preferred. The spacers 24 and the tube sheets 28 may be made by machining, casting, potting, injection molding or any other technique. The alignment holes 26 and 30 in spacers 24 and tube sheets 28, respectively, may be made merely by drilling using tooling with multiple drill heads.

Once the alignment holes are made in the spacers and tube sheets, the tubes 14 can be inserted through the alignment holes, such as by using a steel rod as a mandrel within the tubes, to provide support for the tubes as they are threaded through the alignment holes. If this type of technique is used to insert the tubes through the alignment holes, it is preferred to use a jig with mandrels aligned in a predetermined spacing and orientation corresponding to a desired orientation of the tubes 14 within the array and the alignment holes 26 of the spacer 24. A similar jig with mandrels aligned in a predetermined spacing and orientation corresponding to a desired orientation of the tube end portions 15 with the alignment holes 30 of the tube sheet 28, if the tube sheet 28 has a different spacing or orientation than the alignment holes 26 in the spacer 24. The jig can be used to more efficiently than an individual steel rod, for instance, by extending the mandrels through the alignment holes and into ends of the tubes, and retracting the tubes on the mandrels through the alignment holes in the spacers and tube sheets.

Injection molding, for example using an epoxy polymer, and casting and potting will be described below, for forming the tube sheets 28 around the end portions 15 and ends 17 of the tubes. Also described below are methods of casting or potting the spacers 24 around the tubes in one or two layers.

FIGS. 7 and 7A depict exemplary spacing of the tubes 14 in the array 12. Since the tubes may sag or otherwise move somewhat when the coil assembly is in use, it is best to describe the spacing of the tubes in the layers 20 and columns 22 by referring to the spacing of the alignment holes 26 in the tube spacers 24. As a result, the references below to the alignment holes 26, 26a, 26b, 26c and 26d, will reflect the preferred tube spacing, and therefore, the explanation will generally refer to the tube spacing rather than to the alignment hole spacing.

As shown with respect to FIGS. 7 and 7A, the tubes are vertically staggered with respect to adjacent horizontal layers 20 when the coil assembly is used in a counterflow evaporative heat exchanger where the air direction 36 is upwards in the orientation of the coil assembly as illustrated. In a cross-flow situation, the air flow would be generally transverse to the vertical, but the spacing will still be described with respect to the air flow direction, regardless of whether the use is counterflow or cross-flow.

All of the alignment holes 26 and tubes 14 could be arranged to be in alignment both in the direction of the air and transverse to the air direction (vertically and horizontally in FIGS. 7 and 7A). However, to usually enhance heat exchange, in a preferred embodiment, the alignment holes 26 in the spacers 24, and therefore, the tubes 14, are arranged in transversely staggered adjacent layers 20a, 20b and 20c to maintain the tubes in adjacent layers in a corresponding transversely staggered relationship in the pass 16 and in the return bends 18. The staggering is represented by the offset vertical alignment of hole 26b in layer 20b and column 22b with respect to the holes 26a and 26d in the next adjacent (upper in FIG. 7A) layer 20a at columns 22a and 22c, respectively, and with respect to the hole 26c in the next adjacent (lower in FIG. 7A) layer 20c at column 22a.

In one embodiment, the alignment holes 26 and the tubes 14 are arranged so that the number of holes in the spacer and tubes in one layer of the pass 16, such as layer 20a in the spacer, is an even number of holes and tubes, and the number of holes in the spacer and tubes in the pass in an adjacent layer, such as layer 20b in the spacer, is an odd number of tubes. In another embodiment, such as illustrated in FIG. 7, the adjacent layers can have the same number of holes and tubes, but they are offset from each other in adjacent layers.

With further reference to FIG. 7A, the spacing may be explained further as follows. The tubes have an outer diameter D, and the alignment holes 26a and 26c aligned in every other layer 20a and 20c have a center-to-center spacing $S_L$ from each other in a direction of intended air flow 36 through the coil assembly of about 2D to about 4D. The alignment holes 26a, 26b and 26b, 26c in adjacent layers 20a and 20b have a center-to-center spacing $S_V$ from each other in the direction of intended air flow 36 externally through the coil assembly of about D to about 2D. The alignment holes 26a and 26d transversely aligned with each other on the same level 20a have a center-to-center spacing $S_T$ from each other in a direction transverse to the direction of intended air flow 36 through the coil assembly of about 2.5D to about 4D. The alignment holes 26a, 26b and 26b, 26d in adjacent layers 20a, 20b have a transverse center-to-center spacing $S_H$ from each other in a direction transverse to the direction of intended air flow 36 through the coil assembly of about 0.5D to about 2D.

Preferably, in one embodiment, the spacing $S_L$ is about 3D to about 4D, the spacing $S_V$ is about 1.3 D to about 2D, the spacing $S_T$ is about 3D to about 4D, and the spacing $S_H$ is about D to about 2D. More preferably in another embodiment, the spacing $S_L$ is about 3.73D, the spacing $S_V$ is about 1.6 D, the spacing $S_T$ is about 3.33D, and the spacing $S_H$ is about 1.67D.

FIGS. 1 and 2 schematically show the coil assembly 10 comprising passes 16 with tube bends 18 between and connecting the passes, but no other support structure for the passes 16 or tube sheets 28 are shown for ease of understanding. Once the coil assembly 10 as shown in FIGS. 1 and 2 is formed, it can be seen that the tubes retain their relative positional relationship throughout the coil assembly, including the passes and return bends. Note, for example that the tubes 14 at layer 20a are on the bottom of the lowest pass 16a. Following the serpentine path from the lowest pass 16a to the top pass 16d, it can be seen that the tubes of layer 20a remain in a generally parallel relationship even around the outside of the return bend 18a and transition to become the upper layer of the intermediate (second) pass 16b. Then the layer 20a transitions around the inside of the return bend 18b to become the bottom layer of the intermediate (third) pass 16c, again transitioning around the outside of the return bend 18c to become the top layer of the top pass 16d. All of these transitions occur while the tubes retain their relative positional relationship within the columns 22a to 22n. The tubes 14 in the array 12 do not cross each other or even come into contact with each other throughout the serpentine pathway, even at the return bends. This allows good flow and interaction of the air and water passing externally through the coil assembly, enhancing heat exchange with the internal process fluid flowing within the interior of the tubes of the coil assembly.

In general, the coil assembly of the first embodiment may be made by a method comprising (a) providing the array 12 of the polymeric tubes 14, first and second tube sheets 28, and a plurality of the tube spacers 24, where the array of tubes is initially in an extended linear pathway;

(b) locating the tubes 14 in the spacers 24 such that the tubes are in the alignment holes 26 in the spacers;

(c) aligning the tubes at a first end 17 (such as at the end that will become the lowest pass 16a) within the first tube sheet 18 so that fluid can flow internally through the tubes;

(d) aligning the tubes at the second end 17 (such as at the end that will become the top pass 16d) within the second tube sheet 28 so that fluid can flow internally through the tubes; and (e) folding the array of tubes from the initial extended linear pathway to form the serpentine pathway having the linear passes 16 and at least one return bend 18 (and as shown, three tube bends), such that the relative positional relationship of the tubes with respect to each other is maintained in the passes and in the return bends.

The folding operation to form the array into passes and return bends in a serpentine manner can be done several ways. One way would be to lay the array 12 on its side within a segmented support structure of a folding apparatus that may have wheels for easier movement of the array. Each segment of the apparatus corresponds to a pass 16 to be formed and is hinged to or otherwise moves independently of the adjacent segments. The array 12 on its side is then folded as the spacers 24 are being added to the tubes of the array as the array is placed upon the folding apparatus. Each segment is moved so that each corresponding pass 16b and 16c is then placed so as to be over the preceding one until the top pass 16d is formed, completing the serpentine pathway. The serpentine assembly then may be tipped upright to the position shown in FIGS. 1 and 2. An alternate method would be to partially fold and stack each pass in a folding apparatus. Once all of the passes have been formed and are in the segmented folding apparatus the segments can move in their confined tracks to complete the folding operation. After the array has been folded, any supporting members can be attached, such as to the edges of the tube spacers 24 and the tube sheets 28, and/or any optional heat exchange media and water redistribution media (described below) can be added and the coil strapped and shrink wrapped for inventory, shipping or insertion into a heat exchange apparatus or a frame assembly.

Figure 3:
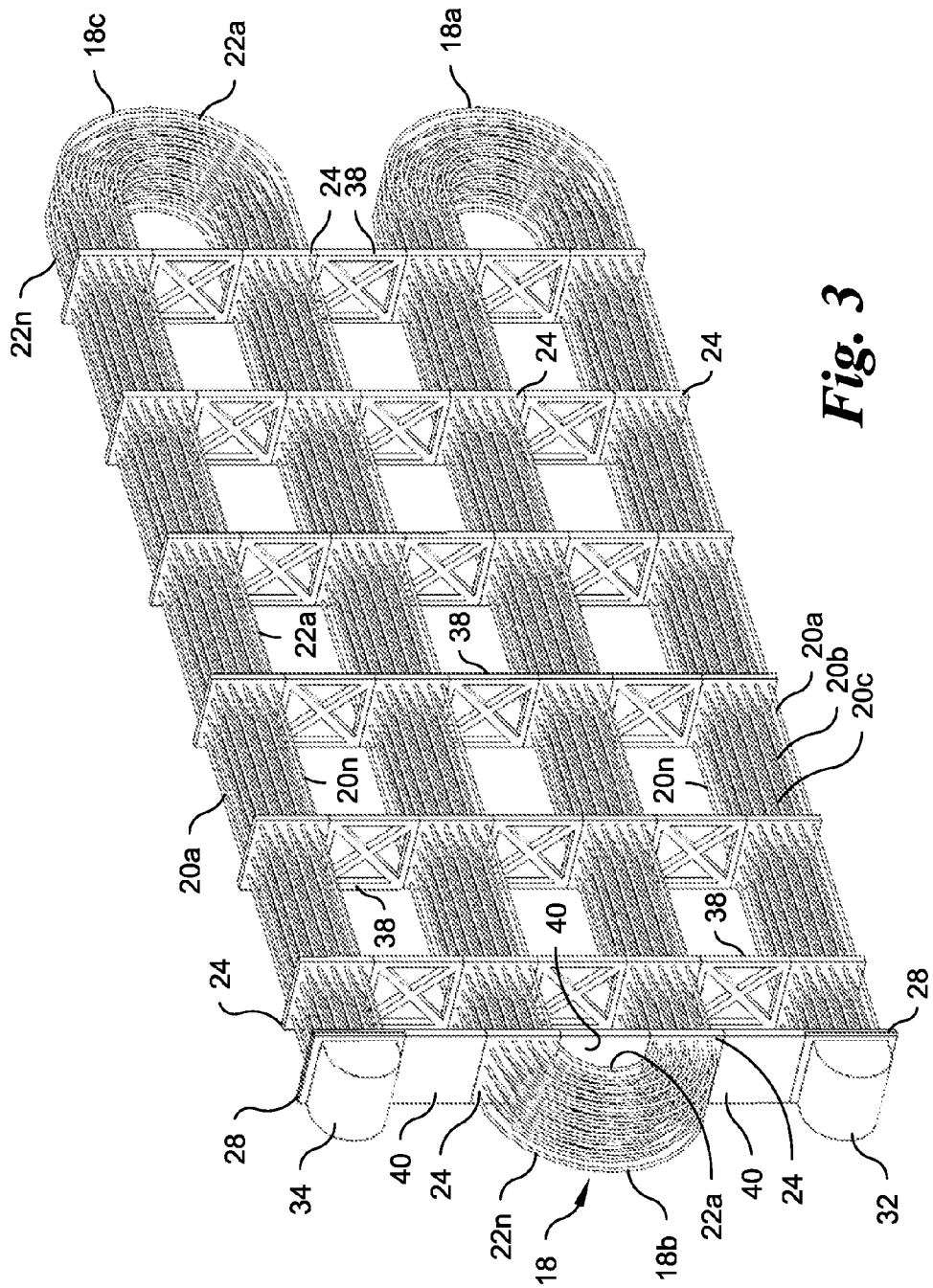
FIG. 3 is an isometric view of the polymeric coil assembly of FIG. 2 including support structures supporting the tube sheets and spacers and thereby supporting the tubes forming the passes.

With reference to FIG. 3, the tube bends and therefore the serpentine pathway of the coil assembly may also be formed by the following method, where integral support members are located within the coil assembly to support the tube sheets 28 and the passes 16 by supporting at least some of the tube spacers 24. Two types of support members 38 and 40 may, but need not, be used. The support members 38 have an open structure and are better adapted for use within the interior regions of the coil assembly to support the tube spacers 24, so that air and water passage is not significantly adversely affected. As shown in FIG. 3, the support members 38 support all of the spacers 24, in a preferred embodiment. The support members 40 have a closed structure and are better used at the outside regions of the coil assembly, such as to support the tube sheets 28 and any manifolds 32 or 34 attached to the tube sheets. In the schematic illustration of FIG. 3, the return bend 18b is shown extending beyond the side of the coil assembly farther even than the manifolds 32 and 34. In this situation, it would likely be better to use support members 38, rather than support member 40 to support the tube sheet 28 and the inlet manifold 34, so that the support members do not block the side of the coil assembly. However, the support members 40 with the closed structure are shown merely for purposes of explanation, but could very well be used in some embodiments where the tube sheets and manifolds extend beyond any of the return bends.

An exemplary method of making a coil assembly having supports like supports 38 and/or 40 comprises aligning and attaching a tube sheet support member 40 to the first tube sheet 24 at the lowest pass 16, and aligning and attaching spacer support members 38 to at least some of the spacers 24 in the lowest pass. The support members may be attached using alignment pins and holes in the respective upper or lower edges of the support members on the one hand and the tube sheets and tube spacers on the other hand, by adhesive, by bolting attachment bars or plates between the support members and the tube sheets and tube spacers, or any other suitable technique. The array 12 of tubes is then folded, such as by using a lifting apparatus, like a crane, to form the lowest pass 16a and any lower intermediate pass 16b connected by the return bend 18a in the array, and such that the tube sheet support members 40 support any spacers 24 in any lower intermediate pass (like passes 16b and 16c as shown) that are aligned with the first and second tube supports 28. The spacer support members 38 support at least some, and preferably all of the aligned spacers 24 in any lower intermediate pass (like passes 16b and 16c as shown). For each successive intermediate passes and the top pass (like pass 16d), likewise repeating aligning and attaching tube sheet support members 40 aligned with the first and second tube sheets 28 and likewise aligning and attaching the spacer support members 38 to at least some of the spacers 24 in any intermediate passes and the top pass formed by further folding the array of tubes. In essence, this describes a type of stacking method. In this way, the tube sheet support members 40 support the second tube sheet 28 and the spacer support members 38 support any intermediate passes like passes 16b and 16c, and the top pass, like 16d. A strong coil assembly may be formed in this manner.

Figure 6:
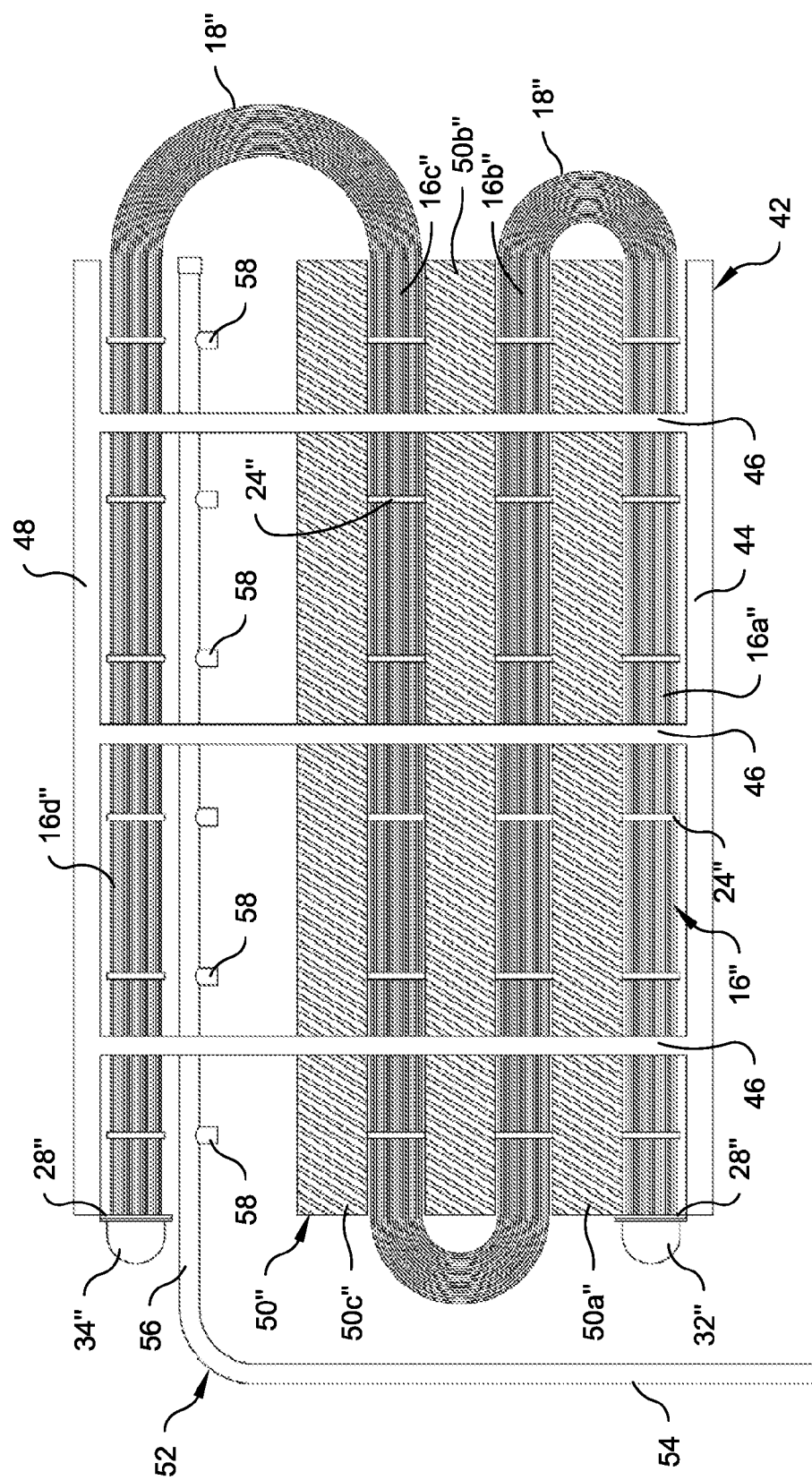
FIG. 6 is a front elevation view of another embodiment of the polymeric coil assembly of the present invention, including an optional water distribution system and exemplary heat transfer media fill between each of the adjacent passes, wherein the coil assembly is supported within a frame.

Another method of making a supported coil assembly is as follows, where the coil assembly further comprises a frame 42 within which the coil assembly is retained, such as schematically illustrated in FIG. 6, where other optional components are also present and will be described below.

As part of the folding of the array of tubes to form the serpentine pathway, initially place a portion of the initial linear pathway of the array of tubes, which becomes the lowest pass 16a upon folding, on top of a sufficient number of transverse base members (not shown) extending transversely under the portion of the linear pathway that becomes the lowest pass 16a. These transverse base members are aligned with the first tube sheet 24 at the lowest pass 16a and at least some of the spacers 24. The transverse members are connected to longitudinal base members 44 to provide a supporting base frame subassembly.

Vertical supports 46 are attached to and longitudinally spaced along the longitudinal base members 44, and intermediate longitudinal frame members (not shown) are attached to the vertical supports. An intermediate level of transverse support members (not shown) to be located under at least some of the spacers 24 are attached to the intermediate longitudinal frame members to support an intermediate pass 16b of the coil assembly. The initial linear pathway of tubes is then folded to form the lowest pass 16a and a pass 16b above the lowest pass.

As many additional intermediate longitudinal frame members are attached to the vertical supports and transverse support members attached to the intermediate longitudinal frame members as necessary to support at least some of the spacers 24 in additional passes, such as pass 16c, if any, and the top pass 16d of the longitudinal array of tubes to form the serpentine pathway of the coil assembly. An intermediate transverse member (not shown) is attached to the appropriate level of an intermediate longitudinal frame member to support the second tube sheet 28 attached to the ends 17 of the tubes 14 at the top pass 16d. Then the linear pathway of tubes is folded to form the additional intermediate passes, if any, and the top pass 16d, to be supported by the intermediate transverse support members and thereby form the serpentine pathway of the coil assembly.

There may be a tendency with some tubes for the passes to rise during and after formation of the serpentine coil assembly. If this is the situation with a particular coil assembly, to retain the top pass 16d in an appropriate position, upper longitudinal frame members 48 may be attached to the vertical supports 46. Attaching at least two upper transverse frame members (not shown) to the longitudinal upper frame members 48 above the top pass 16*d* would fully complete the frame 42 and retain the coil assembly 10 in a serpentine shape.

The method just described relates to constructing an external frame 42 while folding the array 12 of tubes 14 into it to make a coil assembly where each pass 16 of the serpentine pathway is supported while the coil assembly is being formed. An alternative to retain a coil assembly within an external frame is as follows.

There are embodiments as mentioned above and to be explained below, where the coil assembly can be formed and simply banded or otherwise constructed, for example as described above with reference to FIG. 3. A frame subassembly, which in a front elevation view would look like the frame 42 in FIG. 6, could be provided if a particular use of the coil assembly in a heat exchange apparatus would require the coil assembly in a frame, or if an installation of the coil assembly retained within an external frame would provide a better installation. More specifically, a partial frame subassembly could be provided where the partial frame subassembly comprises transverse base members connected to longitudinal base members 44, vertical supports 46 connected to and longitudinally spaced along the longitudinal base members 44, and longitudinal upper frame members 48 connected to the vertical supports 46. The serpentine coil assembly 10 then is lifted, such as by using a crane, and placed into the partial frame subassembly. At least two upper transverse frame members may then be connected to the longitudinal upper frame members 48 to complete the frame and retain the coil assembly in a serpentine shape within it.

Figure 4:
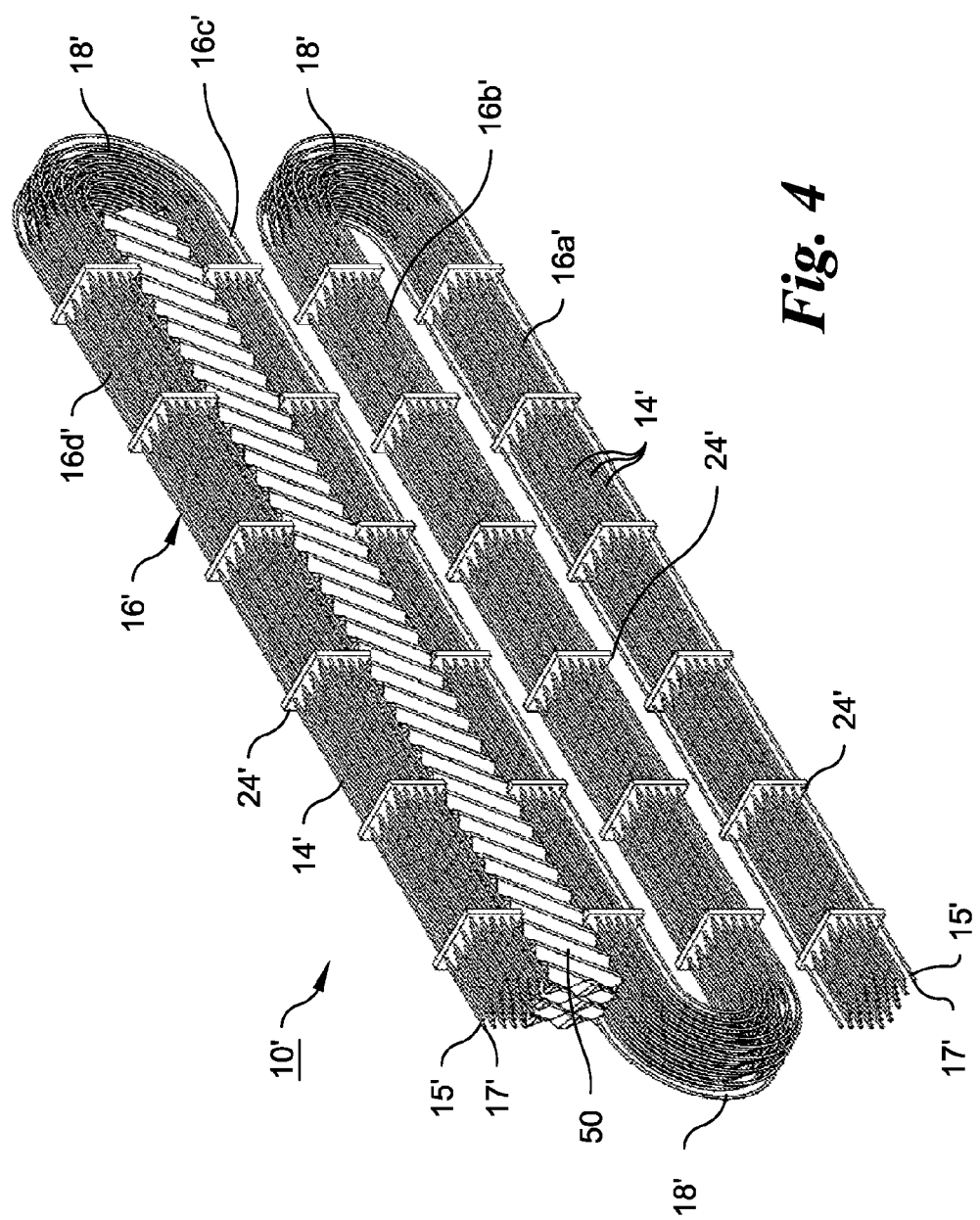
FIG. 4 is an isometric view of another exemplary embodiment of a polymeric coil assembly according to the present invention showing the use of one level of exemplary heat transfer media fill between the upper pass and the next lower pass that may be used to support the upper pass.
Figure 5:
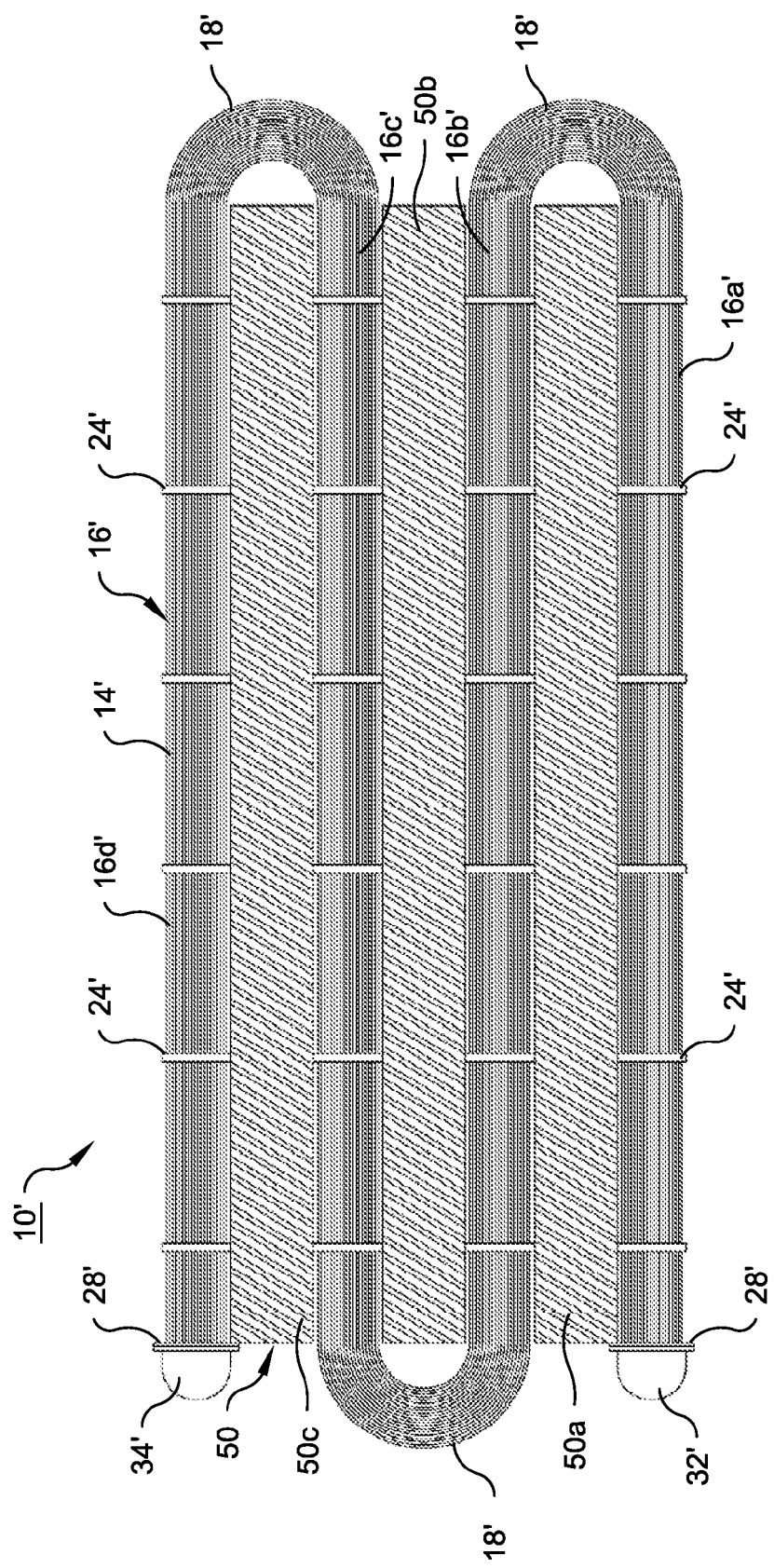
FIG. 5 is a front elevation view of another embodiment of the polymeric coil assembly like FIGS. 2 and 3 and with exemplary heat transfer media fill between each of the adjacent passes, where each level of the media fill may be used to support the pass above it.

Another embodiment of the invention relates to another coil assembly 10' for use in heat exchange applications. FIGS. 4 and 5 illustrate certain aspects of this embodiment. Components of this embodiment having the same function as like components of the first embodiment coil assembly 10 are identified by the same numerals that are primed, and will not be described in detail or at all except for any significant differences between the embodiments or where there is a need for an explanation. New components of this embodiment will be identified by different numerals.

This embodiment of the coil assembly 10' comprises an array 12' of polymeric tubes 14' including at least two generally linear passes 16' of at least two layers 20' of tubes extending for a predetermined longitudinal distance, and heat exchange and water redistribution media 50 between at least two passes of the coil assembly.

The heat exchange and water redistribution media 50 used with the coil assembly 10' may be any type of a great many that is typically referred to "contact bodies," "fill," "wet deck fill," "film fill media" and otherwise, that is well-known in the heat exchange industry and is readily available commercially from many sources, such as Brentwood Industries, Inc., as "AccuPac® cross-fluted film fill media," for instance product No. CF1200. With this type of fill, typically used in cooling towers, water or other cooling liquid is distributed as a thin film over the extended fill surface for maximum cooling efficiency. This type of media is referred to as direct contact heat transfer or direct contact heat exchange media, because air and water contact each other directly across the fill surface, whereupon a small portion of the distributed water is evaporated, resulting in direct evaporative cooling of the water, which is usually collected in a sump for recirculation over the wet deck fill and any coil assembly used in the apparatus for indirect heat exchange. These products are typically but not exclusively made of PVC sheets that have angled corrugations, where the sheets are bonded together by various means such that the angled corrugations are generally at opposite angles on facing sheets to assure a good mixture of air and water, resulting in effective and efficient heat transfer between the air and water.

The heat exchange and water redistribution media 50 may also include other types of heat exchange and water distribution or redistribution media, such as drift eliminators, usually used in cooling towers to reduce "drift" of water droplets that would otherwise escape the cooling tower. Air and water are contacted directly in drift eliminators, too. Many types of drift eliminators are available and useful in this coil assembly embodiment. Cellular drift eliminators, which typically include alternating series of corrugated and wave or flat PVC sheets, assembled to form closed cells, are preferred and are also readily available in several models from Brentwood Industries, Inc., among others.

The heat exchange and water redistribution media is useful in the coil assembly 10' for several purposes. One is as additional direct contact heat exchange media to enhance the heat exchange properties of the coil assembly 10'. Another purpose is to redistribute water onto the tubes 14' so that there is more even coverage of the water on the tubes 14'. The water is supplied from above by water distributors that may include spray nozzles fed by water distribution pipes, typically used in counterflow installations, or in certain installations and uses, such as cross-flow installations, by gravity-fed troughs. A third purpose of the heat exchange and water redistribution media 50 in the coil assembly 10' is as a supporting structure, when it is positioned between passes 16' in a supporting mode by resting on top of one pass, such as the lowest pass 16*a'*, and below and supporting the next adjacent upper pass, such as intermediate pass 16*b'*. It is not necessary that the heat exchange and water redistribution media 50 be used for any more than one or less than all three purposes in the coil assembly 10'.

FIG. 4 illustrates the use of the heat exchange and water redistribution media 50 between the top two passes 16*c'* and 16*d'*, for all three purposes mentioned above. The heat exchange and water redistribution media functions as a direct contact heat exchanger when water is sprayed or otherwise distributed from above on the top pass 16*d'*, and redistributes the water draining from the tubes 14' in the top pass 16*d'* onto the tubes 14' in the intermediate pass 16*c'*, below it. The heat exchange and water redistribution media 50 also supports the top pass 16*d'* on the intermediate pass 16*c'*.

FIG. 5 shows a maximized use of the heat exchange and water redistribution media 50, for all three purposes, where the heat exchange and water redistribution media 50, as identified by media 50*a*, 50*b* and 50*c*, is located between all adjacent passes 16' of the coil assembly 10'.

While it may be preferred in many instances that the coil assembly 10' is a serpentine coil assembly like coil assembly 10, including return bends 18' connecting each pass 16', it is not necessary that the coil assembly 10' be a serpentine coil assembly or even have any return bends 18' at all. Instead, the passes 16' of the array 12' of tubes 14' may be directly connected to tube sheets 28' and manifolds 32' and 34' at each pass level.

Also, while it is desirable that the tubes 14' in the array 12' of the passes 16' are maintained in substantially the same relative positional relationship with respect to the other tubes 14' in the pass 16', this aspect also is not a requirement in the embodiment of coil assembly 10'.

Although it is well known in the cooling tower industry to use direct contact fill media in conjunction with coil assemblies to enhance heat exchange, the fill media to date is believed to have been separate from the coil assemblies and located either above or below the coil assemblies, rather than being an integral part of the coil assemblies as in the embodiment of coil assembly 10'.

In conjunction with this embodiment of coil assembly 10', where the heat exchange and water redistribution media 50 is between at least two passes 16' of the coil assembly and where the coil assembly is a folded serpentine coil assembly including at least one return bend 18', the method of making the coil assembly 10' further comprises folding the array 12' of tubes 14' around the heat exchange and water redistribution media 50. If the heat exchange and water redistribution media 50a, 50b, and 50c is used between each of the adjacent passes 16' in a serpentine coil assembly including more than one return bend 18', the method of making the coil assembly 10' further comprises folding the array 12' of tubes 14' around the heat exchange and water redistribution media 50a, 50b, and 50c, respectively, at each level to locate the heat exchange and water redistribution media 50a, 50b, and 50c, respectively, between each of the passes 16'.

Yet another embodiment of the invention relates to another coil assembly 10" for use in heat exchange applications. FIG. 6 illustrates aspects of this embodiment along with other optional aspects useful with this embodiment. Components of this embodiment having the same function as like components of the first and second embodiments of coil assemblies 10 and 10' are identified by the same numerals that are double primed, and will not be described in detail or at all except for any significant differences between the embodiments or where there is a need for an explanation. New components of this embodiment will be identified by different numerals.

The coil assembly 10" comprises an array 12" of polymeric tubes 14" including at least two generally linear passes 16" of at least two layers of tubes extending for a predetermined longitudinal distance, the coil assembly further comprising a water distribution subassembly 52, integrally included within the coil assembly 10". The water distribution subassembly 52 may be any type of many that are well-known in the cooling tower and heat exchange industry and is therefore illustrated schematically in FIG. 6. The water distribution subassembly 52 includes a water supply pipe 54, which may be associated with appropriate valves, pumps, and standard control equipment, etc., to supply water from any desired source, such as from a sump below the coil assembly with make-up water from municipal or other sources. The water supply pipe 52 connects with one or more water distribution pipes 56, typically several water distribution pipes 56 located above the plan area of at least one pass 16" to supply water distributors 58, such as spray nozzles typically used in counterflow installations.

While it may be preferred in many instances that the coil assembly 10" be a serpentine coil assembly like coil assembly 10, including return bends 18" connecting each pass 16", it is not necessary that the coil assembly 10" be a serpentine coil assembly or even have any return bends 18" at all. Instead, the passes 16" of the array 12" of tubes 14" may be directly connected to tube sheets 28" and manifolds 32" and 34" at each pass level.

Also, while it is desirable that the tubes 14" in the array 12" of the passes 16" are maintained in substantially the same relative positional relationship with respect to the other tubes 14" in the pass 16", this aspect also is not a requirement in the embodiment of coil assembly 10".

FIG. 6 also illustrates that the coil assembly 10" is retained within a frame 42, as described above with respect to the first embodiment coil assembly 10. The frame 42 is shown only for ease and economy of illustration and need not be part of the coil assembly 10".

Moreover, FIG. 6 shows the use of three levels of the heat exchange and water redistribution media 50a", 50b", and 50c", respectively, between each of the passes 16". The heat exchange and water redistribution media 50a" and 50b" serve all three purposes mentioned above for the heat exchange and water redistribution media 50, namely direct heat exchange, water redistribution onto the passes below the media 50, and support for the passes 16b" and 16c" above the respective media 50a" and 50b". The layer of the heat exchange and water redistribution media 50c" between the passes 16c" and 16d" serves only the purposes of direct heat exchange and water redistribution, since its top surface is located well below the bottom surface of the top pass 16d". If desired, only one layer of the heat exchange and water redistribution media 50" may be included between any two passes 16". Furthermore, while it is helpful in many, if not most instances to include the heat exchange and water redistribution media 50" in a coil assembly 10" that integrally includes the water distribution subassembly 52, it is not essential to use any heat exchange and water redistribution media 50" in the coil assembly 10" in its broadest sense.

Although it is well known in the cooling tower industry to use water distributors in conjunction with coil assemblies to supply water for evaporative cooling, to date such water distribution subassemblies are believed to have been separate from the coil assemblies and located above the coil assemblies, rather than being an integral part of the coil assemblies as in the embodiment of coil assembly 10".

In the particular embodiment of the coil assembly 10" the water distribution subassembly 52 is located below the top pass 16d", but the water distribution subassembly 52 can be located anywhere within the coil assembly 10", with or without any heat exchange and water redistribution media 50" as explained above. The location of the water distribution subassembly 52 below the top pass 16d" and above the uppermost layer of the heat exchange and water redistribution media 50c" is merely exemplary and for the purposes of illustration and explanation, and is not a critical placement.

The specific location of the water distribution subassembly 52 below the top pass 16d" and above the heat exchange and water redistribution media 50" may be considered to be a specialized location when used in a heat exchange apparatus that may be used in a combined wet and dry cooling application briefly described as follows: Seasonally, the operation is switched to dry operation to save water used in evaporative cooling. The process water can be directed first through the inside of the tubes 14" as a closed loop fluid cooler and then again over the outside of the tubing through the water distribution subassembly 52, giving the tubes 14" the advantage of passing the process water through the system twice.

Now that several embodiments of coil assemblies 10, 10' and 10" have been described, along with various methods of making them, additional details will be provided about various components of the coil assemblies and how to make certain other components, including certain details of the manifold and particularly the inlet manifold 34, ways to pass tubes or tube end portions through the tube spacers and tube sheets, and ways to use injection molding, casting or potting to form the tube sheets 28 around the tube end portions 15 and to form or build tube spacers 24 around the array 12 of tubes 14 in the coil assemblies.

In certain modes of operation of heat exchange apparatus using the coil assemblies of the present invention, the inlet manifold 34 may receive recycled water or make up water that may contain particulate material that could contaminate of adversely affect operation of the system or block or harm the tubes 14 or other components of the coil assembly or the heat exchanger using it. Accordingly, it would be helpful if the inlet manifold 34 were to have a particulate filter that is easy to access, maintain and replace from time to time.

Figure 8:
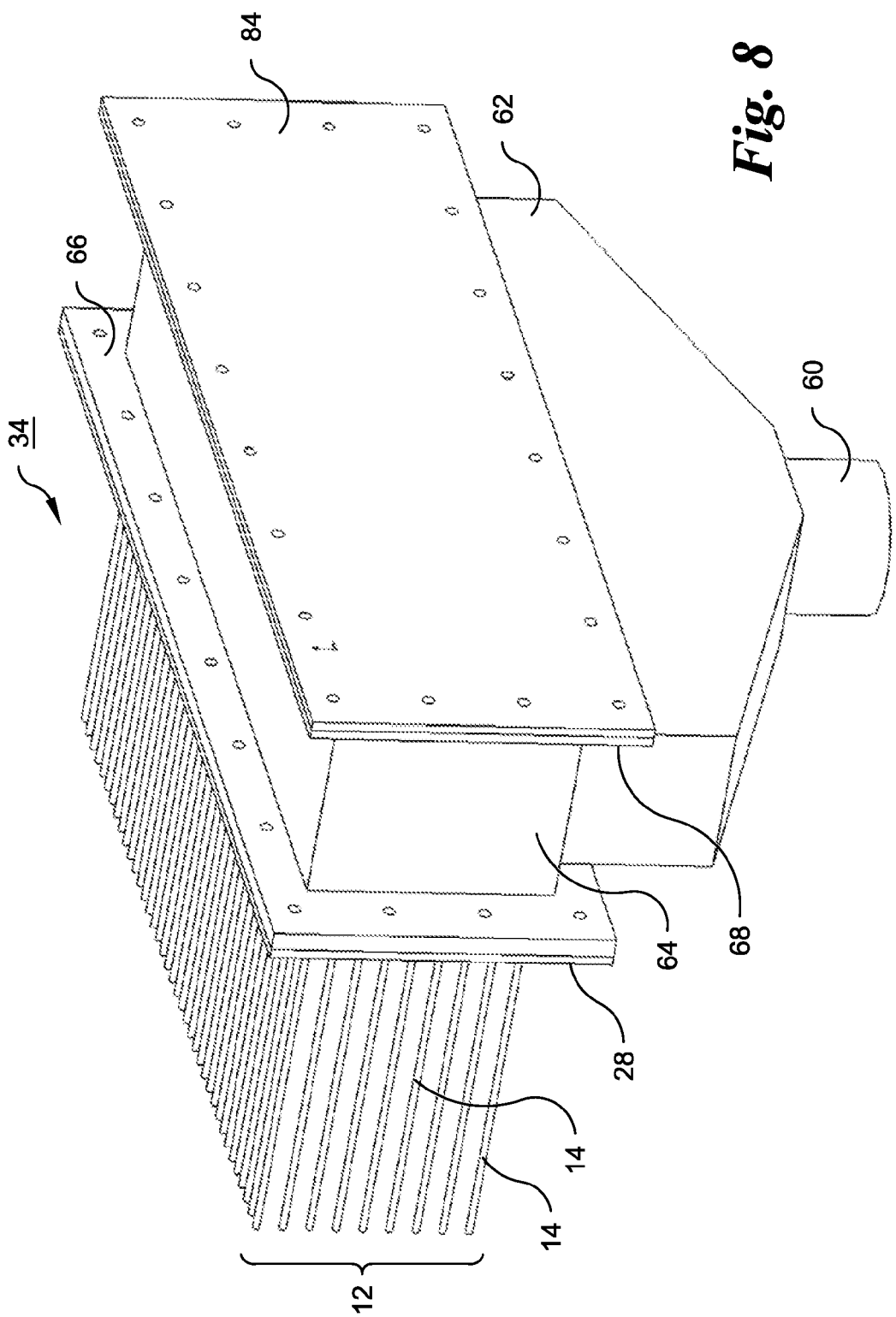
FIG. 8 is an isometric view of one embodiment of a manifold as connected to a tube sheet of a polymeric coil assembly according to the present invention.
Figure 9:
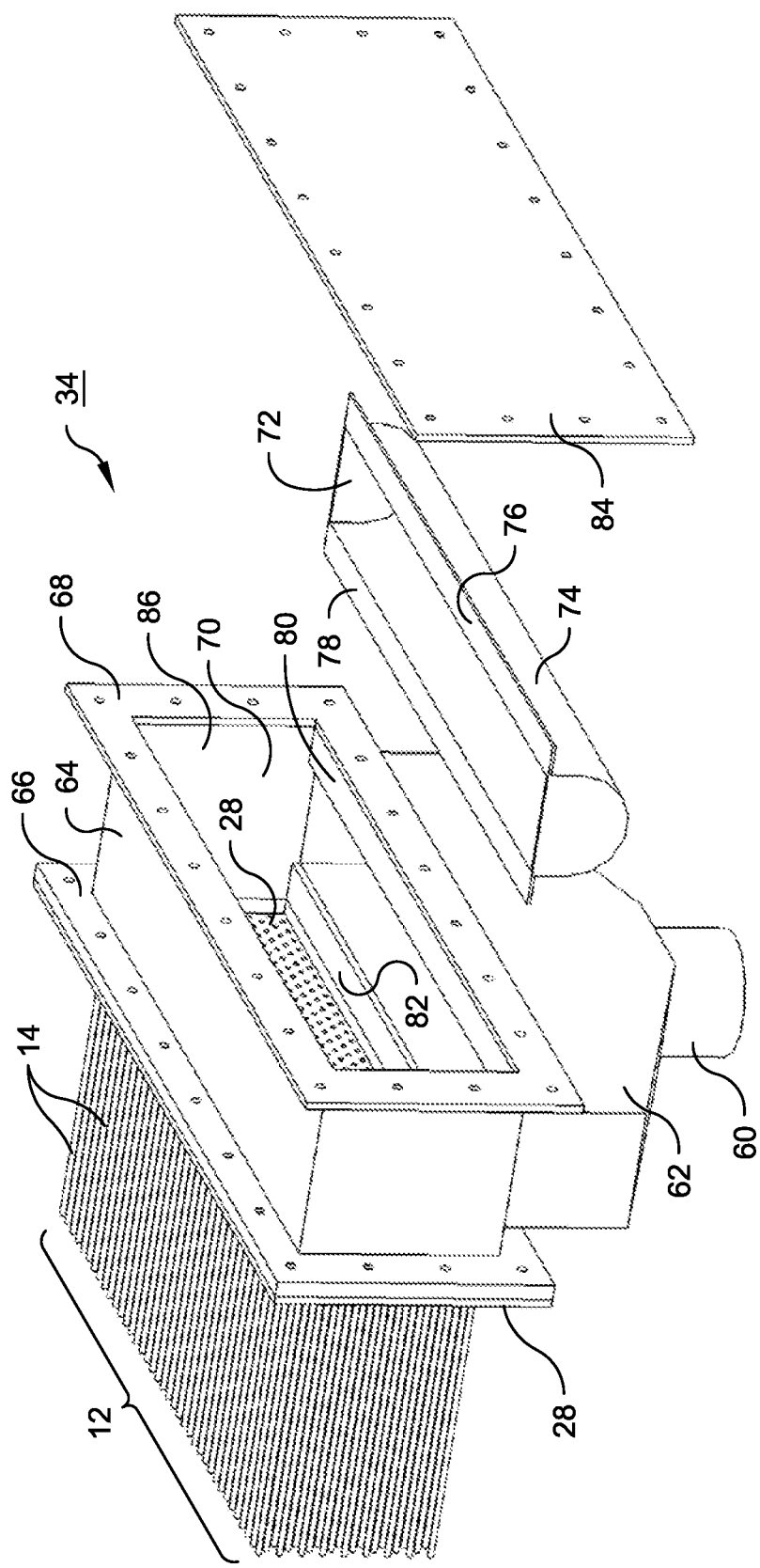
FIG. 9 is an exploded, isometric view of the embodiment of the manifold shown in FIG. 8 with the cover removed and showing an optional filter that could fit into the manifold.
Figure 10:
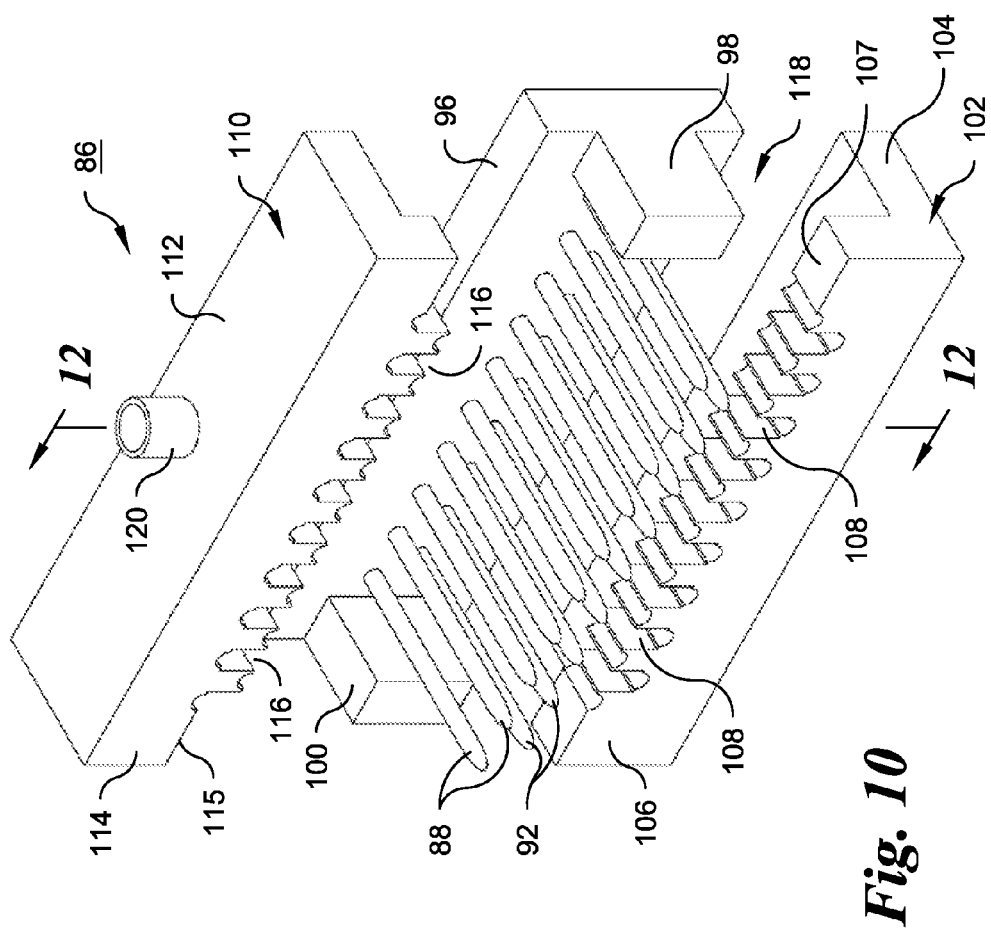
FIG. 10 is an exploded, isometric view of an embodiment of a portion of an overmolding, potting or casting apparatus for making tube sheets for a polymeric coil assembly.
Figure 11:
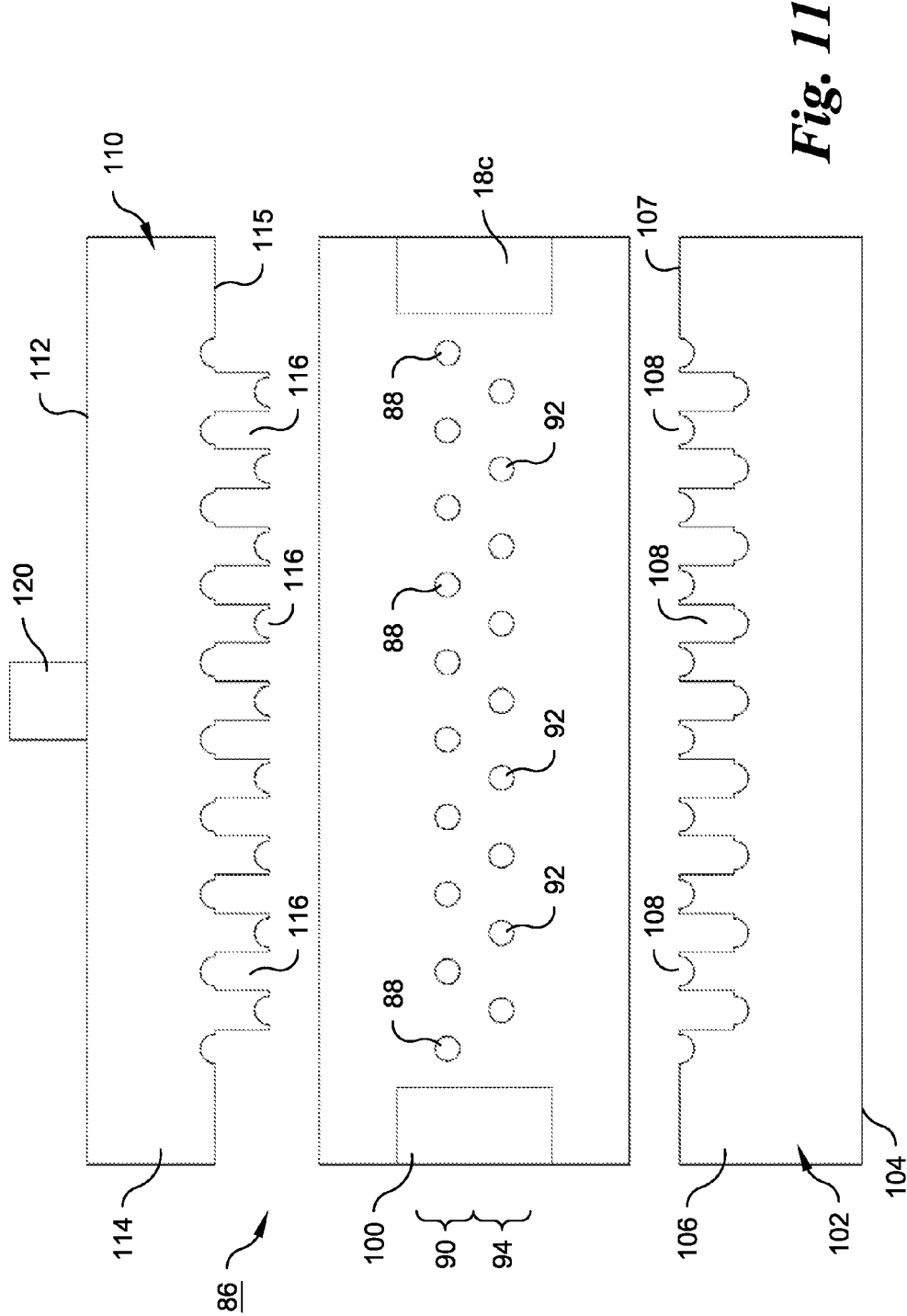
FIG. 11 is a front elevation view of the embodiment of a portion of the overmolding, potting or casting apparatus shown in FIG. 10.

FIG. 8 shows a manifold in a sealed condition and FIG. 9 shows the manifold in an open condition in an exploded view. The manifold is used as the inlet manifold 34 in any embodiments of the coil assembly described herein. The manifold has an inlet conduit 60 from any suitable source of water with appropriate valves and other customary controls, not shown. The inlet conduit 60 is connected to a water receiving housing 62 that in turn is connected to a water delivery housing 64. The water delivery housing 64 is connected to the tube sheet 28 by being bolted, or screwed or otherwise fixed in a sealing manner around a rear peripheral flange 66. A sealing gasket (not shown) may secure the seal between the tube sheet 28 and the rear flange 66. The water delivery housing 64 also has a front peripheral flange 68 and a water delivery chamber 70. A filter unit 72 is removably located in the water delivery chamber 70. The filter unit 72 includes a screen or other type of filter 74 to trap and retain particulate material that may be delivered to the water delivery channel 70 to prevent the particulate material from reaching the tube sheet 28 and the tubes 14 of the array 12 attached to the tube sheet. The filter unit 72 has generally horizontal, opposed front and rear flanges 76 and 78 that rest on generally horizontal, opposed front and rear shelves 80 and 82 to support the filter unit 72.

A removable or openable but sealable cover 84 covers an opening 86 in the manifold to allow access to clean the filter 74 or to replace the filter unit 72. The cover 84 may be bolted, screwed or otherwise sealably but removably attached to the front peripheral flange 68 of the water receiving housing 64. A gasket (not shown) preferably is used to create a seal between the cover 84 and the front peripheral flange 68. Instead of bolting or screwing the cover 84 to the front peripheral flange 68, the cover 84 could be hinged along a top edge of the cover beyond a sealing area to the flange. In the hinged embodiment, only the bottom and perhaps the sides of the cover 84 would need to be bolted or screwed to the corresponding portion of the front peripheral flange 68.

Another aspect of the present invention relates to a method of making a modified coil assembly for use in heat exchange applications, where the modified coil assembly is like coil assembly 10, but without requiring that the array of tubes be formed into a serpentine pathway or that the tubes maintain substantially the same relative positional relationship to each other throughout the array's passes, even without return bends. This method relates more generally to making such a modified coil assembly including forming tube sheets around the ends of the tubes by injection molding, casting or potting. In describing this modified method, the same identifying numerals will be used as were used to describe the coil assembly 10. This is because while certain aspects required in the coil assembly 10 are not required for the modified coil assembly as noted above in this paragraph, the modified coil assembly could very well include and even preferably does include those aspects.

With the understanding that some aspects of the coil assembly are not required for the modified coil assembly as described in the immediately preceding paragraph, a method for making the modified coil assembly will now be described. The modified coil assembly comprises an array 12 of polymeric tubes 14 extending from a first tube sheet 28 through a plurality of alignment holes 26 in a plurality of tube spacers 24 to a second tube sheet, also 28, each tube in the array having a first end 17 and a second end, also 17, the array of tubes comprising at least two generally parallel layers of tubes, the spacers 24 being oriented transversely along a longitudinal distance between the first and second tube sheets 28, the spacers being of a sufficient number and spacing from each other along a longitudinal distance between the tube sheets.

The method for making the modified coil assembly comprises:

providing the array 12 of the polymeric tubes 14, the first and second tube sheets 28, and a plurality of the tube spacers 24;

locating the tubes 14 in the spacers 24 such that the tubes are in the alignment holes 26 in the spacers;

aligning the tubes 14 at the first ends 17 within the first tube sheet 28 so that fluid can flow internally through the tubes;

aligning the tubes 14 at the second ends 17 within the second tube sheet 28 so that fluid can flow internally through the tubes; and forming tube sheets 28 around the ends 17 of the tubes 14 by injection molding, casting or potting.

This method will be described more specifically with reference to FIGS. 10-13 showing an embodiment of an apparatus 86 that could be used for overmolding, casting or potting tube sheet layers to form the tube sheet. The apparatus 86 will be referred to hereinafter generically as a "molding apparatus" or "mold" for the ease of explanation. An injection molding method will be described first.

The molding apparatus 86 includes a plurality of mandrels 88 in a first layer 90 and optionally but preferably, mandrels 92 in a second layer 94. The two layers 90 and 94 are best identified in FIGS. 11 and 12. The mandrels 88 and 90 extend from a rear wall 96 of the mold 86. The mandrels 88, 92 are formed into a predetermined orientation and spacing corresponding to the number, orientation and spacing of tubes 14 in the array 12 in adjacent layers 20a, 20b (see FIGS. 1 and 7A) that can be injection molded, taking into consideration the need to place the mold components around the tubes at the tube end portions 15 having the tube ends 17 and to remove the mold components from the tube end portions 15 after the injection moldable tube sheet layers are formed. As a result, the injection moldable tube sheet layer of tubes (that is, the tube sheet layer that embeds the tube end portions 15 and the tube ends 17) comprises one layer of the tubes 20a in a relative positional relationship within the tube sheet layer if adjacent layers 20a and 20b of the tubes 14 are aligned in a generally perpendicular direction to the layer of tubes, typically if the layers 20a and 20b were adjacent layers in vertical alignment. In this case, a first injection moldable tube sheet layer could only fit around one layer 20a of tubes, since the tubes in the second adjacent layer 20b would be blocked by the tubes in the first layer 20a. In this instance, the mold 86 would only have one layer of mandrels, such as mandrels 88 in the first layer.

The injection moldable tube sheet layer of tubes comprises two layers of the tubes 14 in a relative positional relationship within the array 12 if adjacent layers 20a and 20b of the tubes are staggered with respect to each other in a generally perpendicular direction to the layer of tubes, typically if the adjacent layers 20a and 20b were not in vertical alignment but were staggered as preferred and as shown in FIGS. 1 and 7A. In this case, a first injection moldable tube sheet layer could only fit around both staggered layers 20a and 20b of tubes, since the tubes in the second adjacent layer 20b would not be blocked by the tubes in the first layer 20a. In this instance, the mold 86 would have two layer of mandrels 88 in the first layer 90 corresponding to the tubes 14 in the first layer 20a, and mandrels 92 in the second layer 94 corresponding to the tubes 14 in the second layer 20b that are staggered with respect to the tubes in the first layer 20a. Thus, where staggered tubes are used in adjacent layers of the array, the mold used to make the first injection moldable tube sheet layer could fit around the two staggered layers of tubes such that the injection mold could be removed from the injection moldable tube sheet layer of tubes.

Before continuing with an explanation of the injection molding method the rest of the molding apparatus 86 will now be described.

The molding apparatus 86 further comprises a back wall 96, opposed first and second side walls 98 and 100 preferably unitarily formed with and on opposite sides of the back wall 96, a bottom portion 102 and a top portion 110. The bottom portion 102 comprises a bottom wall 104, a front wall 106 with an upper edge 107, and cavities 108 extending into the upper edge. The top portion 110 comprises a top wall 112, a front wall 114 with a lower edge 115, and cavities 116 extending into the lower edge. When closed, the molding apparatus 86 has a molding chamber 116, defined by the side walls 98 and 100, the back wall 96, the bottom wall 104, the front walls 106 and 115 and the top wall 112. The cavities 108 and 116 are registered with each other to fit over the appropriate number and orientation of mandrels 88 and 92 sealingly against any tube end portions 15 that are placed over the mandrels 88 and 92. A port 120 is provided at any convenient location, such as without limitation the top wall 112 to provide access to the molding chamber 118.

Figure 12:
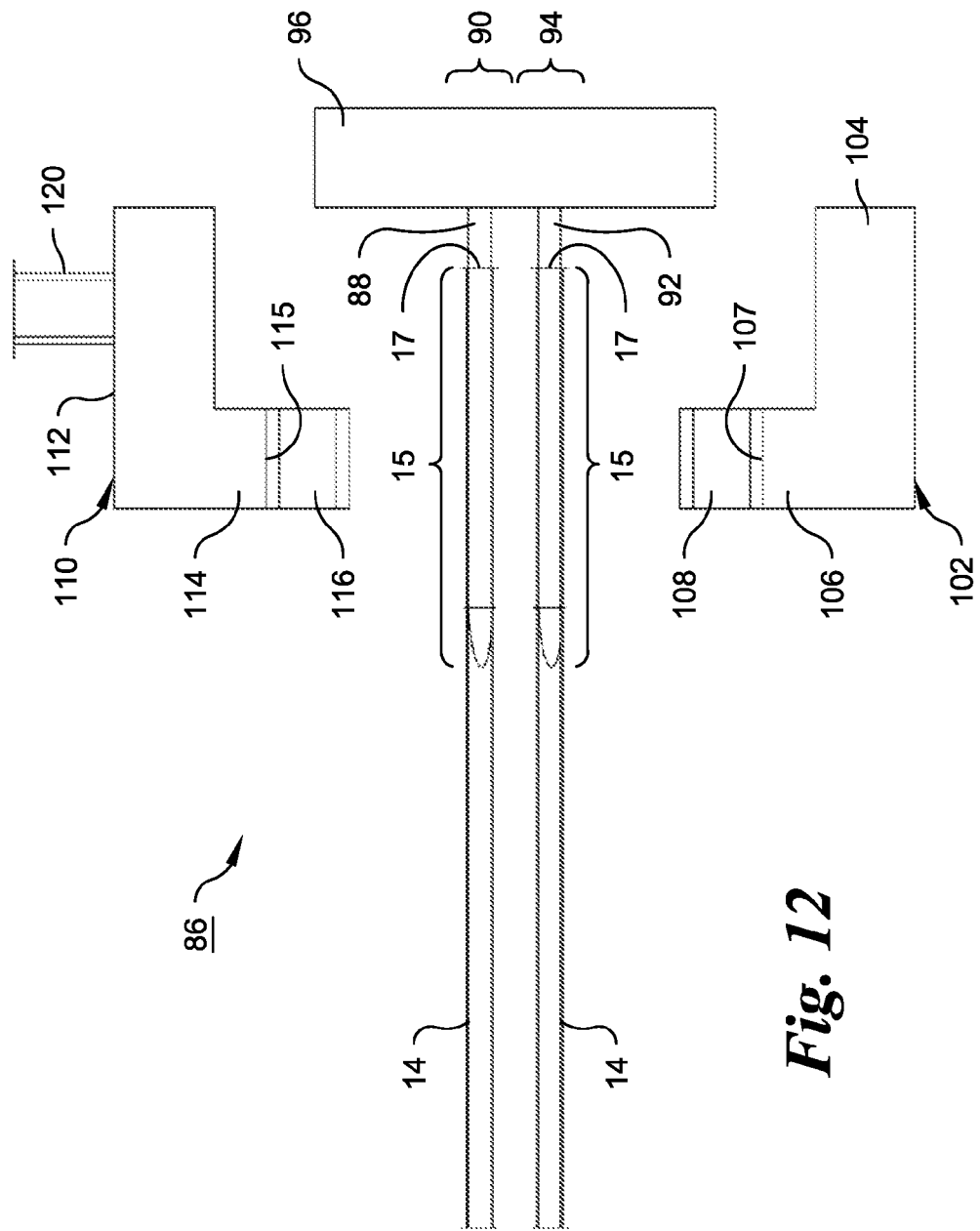
FIG. 12 is a vertical cross-sectional view of a portion of the overmolding, potting or casting apparatus shown in FIGS. 10 and 11, taken along lines 12-12 in FIG. 10, showing the tube ends placed over the mandrels and the apparatus in an exploded, open position.
Figure 13:
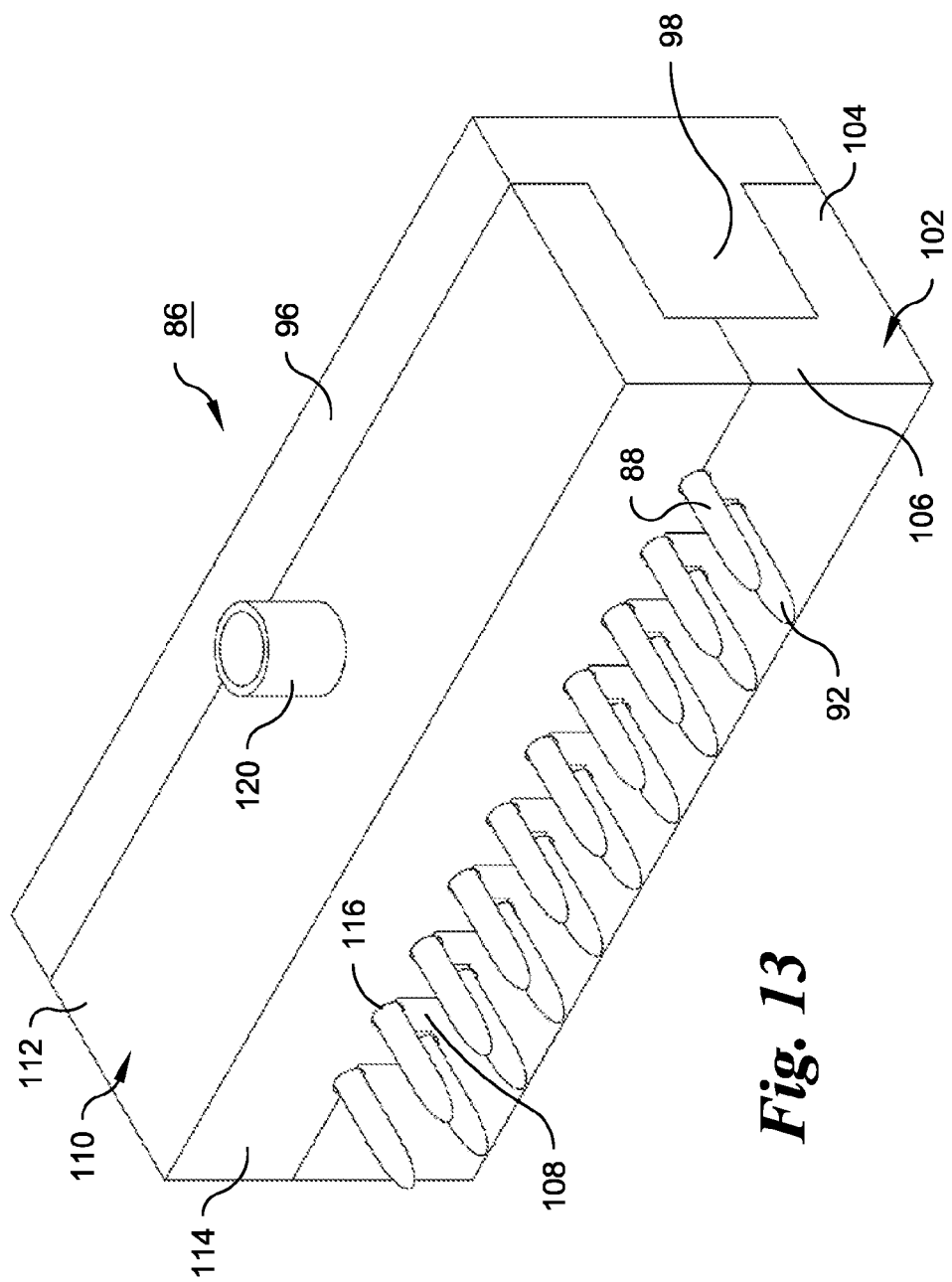
FIG. 13 is an isometric view of the embodiment of a portion of the overmolding, potting or casting apparatus shown in FIGS. 10-12 in a closed position, but without the ends of the tubes over the mandrels.

Continuing now with the injection molding method for forming the tube sheets 28, once the proper number of layers 90 and 94 of mandrels 88 and 92 are determined to be able to make the first injection moldable tube sheet layer of tubes, the tube ends 17 and such of the tube end portions 15 of the tubes 14 that can fit are inserted or placed over the mandrels 88, 92 in the predetermined spacing corresponding to a desired orientation of the injection moldable layer of tubes 14 within the tube sheet 28 to form the injection moldable tube sheet layer of tubes. This is shown in FIG. 12.

The mold 86 is then closed and an injection moldable material used to form the moldable of tubes is injected into the mold chamber 118 through the port 120, and the moldable material is allowed to cure. The moldable material may be any suitable material used to form the tube sheets as mentioned above. When cured, the mold 86 is opened and removed from the molded tube sheet layer. The resulting molded tube sheet layer comprises either one layer or two layers of embedded tube end portions, depending on whether the two adjacent layers of tubes are directly aligned or staggered as explained above.

The foregoing steps are repeated for the number of injection moldable layers of tubes 14 in the array 12. Then the tube sheet layers are aligned with each other and interconnected in alignment to form the tube sheet 28.

The molding apparatus may form tube sheet layers having a top surface and a bottom surface, the top surface having at least one projection or depression, and the bottom surface having at least one depression or projection in locations corresponding in locations to the opposite of the projection or depression on the upper surface. In this case, the method further comprises aligning the tube sheet layers with their embedded tubes on top of each other with the projections and depressions in respective mating registry.

The injection molding method alternatively or additional could include vibration welding, such as sonic or ultrasonic welding, of the tube sheet layers together to form an integral tube sheet 28.

In certain embodiments, the alignment holes 30 in the tube sheets 28 and the mandrels 88 and 92 may have a generally oval cross-section such that the tubes 14 when retained in the tube sheet 28 have a major axis of the generally oval cross-section aligned generally vertically when the coil assembly is in use. The generally oval cross-section of the tubes 14 at the location of the alignment holes 30 of the tube sheet 28 is to compact the tube pattern to obtain a minimal tube sheet area.

As noted above, both the tube sheets 28 and the tube spacers 24 in the modified coil assembly could also be formed by a casting or potting method around the tube end portions 15 and the tube ends 17 to embed the tube end portions and the tube ends within the tube sheet 28 or around the tubes 14 intermediate the tube end portions 15 for the tube spacers 24 anywhere along a pass 16 that the spacers need to be formed. The same casting or potting method regarding the tube sheets 28 and the tube spacers 24 also would apply to any of the other coil assemblies 10, 10' or 10" set forth herein. The casting or potting method is the same for the tube sheets 28 and the tube spacers 24. This casting or potting method will now be described, where some of the concepts and aspects described regarding the injection molding method apply to the casting or potting method. Accordingly, where the same concepts and aspects apply to the injection molding method and to the casting or potting method, they will not be described again in detail.

Figure 15:
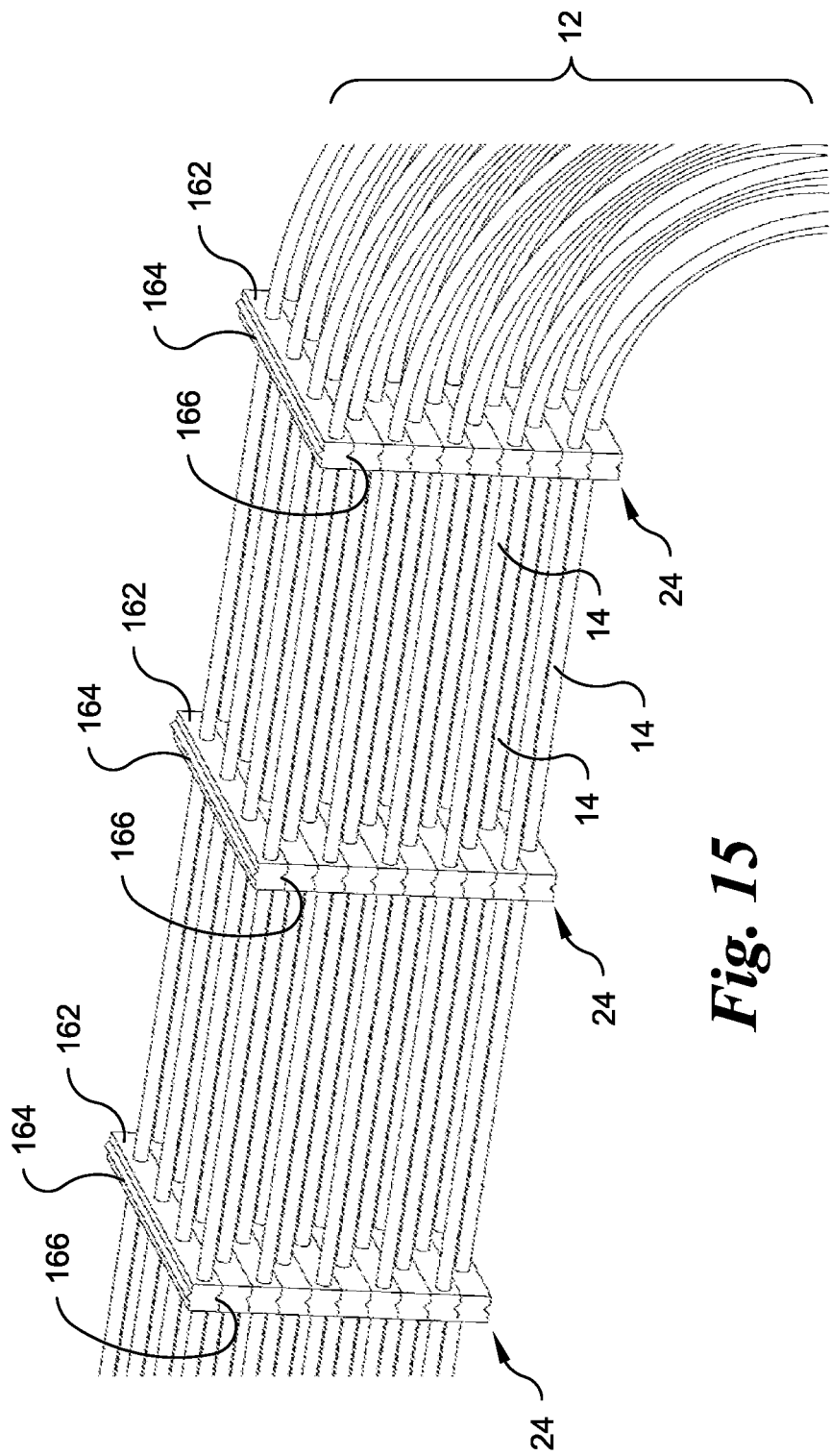
FIG. 15 is an isometric view of a portion of a coil assembly showing the use of spacers made using an apparatus of a type shown in FIG. 14.

The tube sheet or the spacer is respectively formed by a casting or potting method by which tube end portions are embedded within the tube sheet and the tube sheet is formed by a plurality of moldable tube sheet layers, or tubes are embedded in the spacer and the spacer is respectively formed by a plurality of moldable spacer layers. The "moldable tube sheet layers" and the "moldable spacer layers" are equivalent to the "moldable tube sheet layer" described above with respect to the injection molding method for forming the tube sheet 28. Exemplary moldable spacer layers 162 are shown in FIG. 15 as forming spacers 24. Each of the moldable spacer layers 162 in FIG. 15 is shown as embedding only one layer of tubes 14, such as layer 20a for example, for ease of illustration, rather than two adjacent staggered layers of tubes 20a and 20b, which could have been done as explained above with respect to the moldable tube sheet layers.

Figure 14:
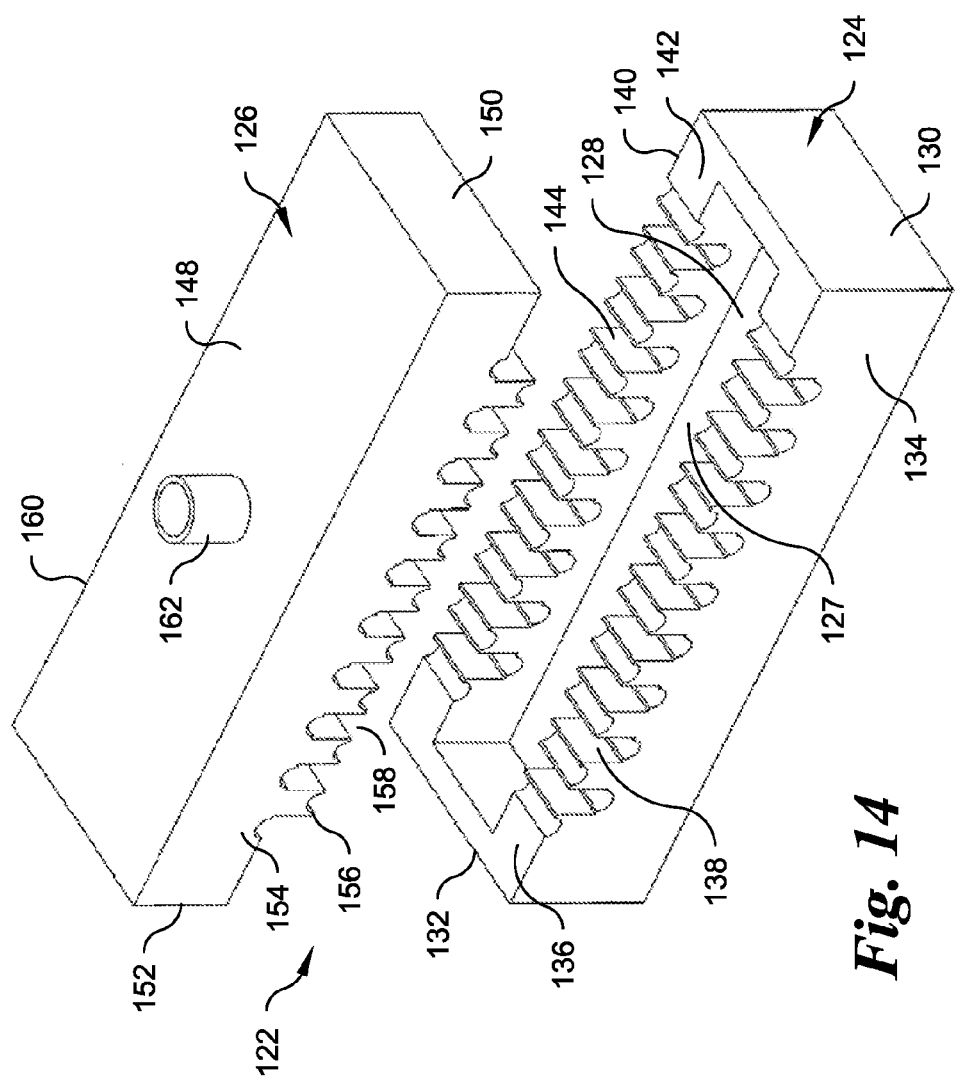
FIG. 14 is an isometric view of a portion of an apparatus for casting or potting tube sheets or spacers for use in the polymeric coil assembly.

The casting or potting method may be performed using an exemplary molding apparatus 122, also referred to as a mold, as shown in FIG. 14, which will now be described.

The mold 122 is in the nature of a pot having a bottom portion 124 and a top portion 126, which together define a mold chamber 127. The mold chamber 127 is bounded by opposing first and second side walls 128, 130 and opposing front and rear walls 134, 140 connected to a bottom wall 128 of the bottom portion 124. The mold chamber 127 is also bounded by opposing first and second side walls 150, 152 and opposing front and rear walls 154, 160 connected to a top wall 148 of the top portion 124. The front and rear walls 134, 140 of the bottom molding portion 124 have upper edges 136, 142 and the front and rear walls 154, 160 of the top portion 126 have lower edges 156 and not shown in FIG. 14.

The mold chamber 127 has a width sufficient respectively to embed the tube end portions 15 in the moldable tube sheet layer or to embed tubes 14 in the moldable spacer layer, the width corresponding to a transverse distance of the pass 16 of the array 12 of tubes 14. The upper edges 136, 142 of the front and rear walls 134, 140 of the bottom portion 124 has spaced lateral cavities 138 with openings extending to a top of the upper edges 136, 140 at locations along the width of the mold chamber 127. The lower edges 156 and not shown of the front and rear walls 154, 160 of the top portion 126 have spaced lateral cavities 158 and not shown with openings extending to a bottom of the lower edges at locations along the width of the mold chamber. The locations of the cavities 138, 144 in the upper edges 136, 142 of the front and rear walls 134, 140 of the bottom portion 127 of the mold and the locations of the cavities 158 and not shown in the lower edges 156 and not shown of the front and rear walls 154, 160 of the top portion 126 of the mold (A) correspond to locations of one layer of the tube end portions in a relative positional relationship respectively within the moldable tube sheet layer or within the moldable spacer layer corresponding to a relative positional relationship of the tubes within the array if adjacent layers of the tubes are aligned in a generally perpendicular direction to the layer of tubes such that the cavities of the mold could only fit around one layer of tubes (as in the case of vertically aligned adjacent layers of tube end portions or tubes), or (B) correspond to locations of two layers of the tube end portions in a relative positional relationship respectively within the moldable tube sheet layer or within the moldable spacer layer corresponding to a relative positional relationship of the tubes within the array if adjacent layers of the tubes are staggered with respect to each other in a generally perpendicular direction to the layer of tubes such that a first moldable spacer layer could fit around the two staggered layers of tubes (as in the case of staggered adjacent vertical layers). The tube sheet area corresponds to or is less than a transverse cross-sectional area of the tube spacer area having the same respective number of tubes.

The casting or potting method comprises:
  providing a casting or potting mold, such as the mold 122;
  locating the respective tube end portions 15 for a moldable tube sheet layer or the tubes 14 for a moldable spacer layer within the cavities 138, 144 formed in the upper edges 136, 142 of the front and rear walls 134, 140 of the bottom portion 124 of the mold;
  closing the mold around the respective tube ends 17 or tubes 14 so as to register with the cavities 158 and not shown formed in the lower edges 156 and not shown of the front and rear walls 154, 160 of the top portion 126 of the mold;
  sealing the mold around the respective tube ends 17 or tubes 14 and where the top portion 126 joins the bottom portion 124;
  pouring casting or potting material into the mold 122, where the casting or potting material may be any material suitable for forming the tube sheets 28 or the tube spacers 24 as mentioned above;
  curing the casting or potting material to form the respective moldable tube sheet layer or the moldable spacer layer 162;
  removing the mold from the respective moldable tube sheet layer or the moldable spacer layer;
  repeating the foregoing steps for the number of the respective moldable layers of tube end portions 15 or tubes 14 in the array; and
  locating and interconnecting the respective moldable tube sheet layers in alignment to form the tube sheet 28 or the moldable spacer layers 162 to form the spacer 24.

The molding apparatus 122 may form tube sheet layers or spacer layers 162 having a top surface and a bottom surface, the top surface having at least one projection 164 or depression, and the bottom surface having at least one depression 166 or projection in locations corresponding in locations to the opposite of the projection or depression on the upper surface. In this case, the method further comprises aligning the tube sheet layers or the spacer layers 162 with their embedded tubes 14 on top of each other with the projections 164 and depressions 166 in respective mating registry.

The casting or potting method alternatively or additional could include vibration welding, such as sonic or ultrasonic welding, of the tube sheet layers together to form an integral tube sheet 28 or the spacer layers 162 together to form integral spacers 24.

In certain embodiments, the alignment holes 26 in the spacers 24 may have a generally oval cross-section such that the tubes 14 when retained in the spacer 24 have a major axis of the generally oval cross-section aligned generally vertically when the coil assembly is in use. The generally oval cross-section of the tubes 14 at the alignment holes 26 of the spacer 24 is to maintain the position of the spacer 24 along the length of the tubes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of making a coil assembly for use in heat exchange applications, the coil assembly (10, 10', 10") comprising:
  an array (12, 12', 12") of polymeric tubes (14, 14', 14") extending from a first tube sheet (28, 28', 28") through a plurality of alignment holes (26) in a plurality of tube spacers (24, 24', 24") to a second tube sheet (28, 28', 28"), each tube in the array having a first end (17) and a second end (17);
  the array of tubes extending from the first tube sheet to the second tube sheet along a serpentine pathway including at least two generally linear passes (16, 16', 16") extending for a predetermined longitudinal distance, where the array of tubes extends between the passes by way of one return bend (18, 18', 18") between each two passes;
  the array of tubes in each pass comprising at least two generally parallel layers (20) of tubes;
  the tubes maintaining their relative positional relationship to each other in the passes and in the return bends; and
  the spacers being oriented transversely along the longitudinal distance of the passes; and
  the spacers being of a sufficient number and spacing from each other along the longitudinal distance of the passes to support and maintain the tubes in their relative positional relationship in the passes and in the return bends;

the method comprising:
(a) providing the array of the polymeric tubes, the first and second tube sheets, and a plurality of the tube spacers, where the array of tubes is initially in an extended linear pathway;
(b) locating the tubes in the spacers such that the tubes are in the alignment holes in the spacers;
(c) aligning the tubes at the first end within the first tube sheet so that fluid can flow internally through the tubes;
(d) aligning the tubes at the second end within the second tube sheet so that fluid can flow internally through the tubes;
(e) folding the array of tubes from the initial extended linear pathway to form the serpentine pathway having the linear passes and at least one return bend, such that the relative positional relationship of the tubes with respect to each other is maintained in the passes and in the return bends; and
wherein the first tube sheet is connected to the first end of the tubes at a pass forming a lowest pass (16a, 16a', 16a") and the second tube sheet is connected to the second end of the tubes at a pass forming a top pass (16d, 16d', 16d"), the coil assembly further comprising tube sheet support members (40) supported by the first tube sheet up to and aligned with the second tube sheet to support the second tube sheet, and spacer support members (38) attached to and aligned with at least some of the spacers in the lowest pass, at least some of the spacers in any intermediate passes (16b, 16b', 16b", 16c, 16c', 16c") between the lowest pass and the top pass, and at least some of the spacers in the top pass, and
wherein the method further comprises aligning and attaching a tube sheet support member to the first tube sheet and aligning and attaching spacer support members to at least some of the spacers in the lowest pass, folding the array of tubes to form the lowest pass and any lower intermediate pass, and such that the tube sheet support members supports any spacers in any lower intermediate pass aligned with the first and second tube supports and such that the spacer support members support at least some of the aligned spacers in any lower intermediate pass, and for each successive intermediate and the top passes, likewise repeating aligning and attaching tube sheet support members aligned with the first and second tube sheets and likewise aligning and attaching the spacer support members to at least some of the spacers in any intermediate passes and the top pass formed by further folding the array of tubes, whereby the tube sheet support members support the second tube sheet and the spacer support members support any intermediate passes and the top pass.

2. A method of making a coil assembly for use in heat exchange applications, the coil assembly (10, 10', 10") comprising:
an array (12, 12', 12") of polymeric tubes (14, 14', 14") extending from a first tube sheet (28, 28', 28") through a plurality of alignment holes (26) in a plurality of tube spacers (24, 24', 24") to a second tube sheet (28, 28', 28"), each tube in the array having a first end (17) and a second end (17);
the array of tubes extending from the first tube sheet to the second tube sheet along a serpentine pathway including at least two generally linear passes (16, 16', 16") extending for a predetermined longitudinal distance, where the array of tubes extends between the passes by way of one return bend (18, 18', 18") between each two passes;
the array of tubes in each pass comprising at least two generally parallel layers (20) of tubes;
the tubes maintaining their relative positional relationship to each other in the passes and in the return bends; and
the spacers being oriented transversely along the longitudinal distance of the passes; and
the spacers being of a sufficient number and spacing from each other along the longitudinal distance of the passes to support and maintain the tubes in their relative positional relationship in the passes and in the return bends;
the method comprising:
(a) providing the array of the polymeric tubes, the first and second tube sheets, and a plurality of the tube spacers, where the array of tubes is initially in an extended linear pathway;
(b) locating the tubes in the spacers such that the tubes are in the alignment holes in the spacers;
(c) aligning the tubes at the first end within the first tube sheet so that fluid can flow internally through the tubes;
(d) aligning the tubes at the second end within the second tube sheet so that fluid can flow internally through the tubes;
(e) folding the array of tubes from the initial extended linear pathway to form the serpentine pathway having the linear passes and at least one return bend, such that the relative positional relationship of the tubes with respect to each other is maintained in the passes and in the return bends; and
wherein the coil assembly further comprises a frame (42) within which the coil assembly is retained, the method further comprising:
(e)(1) as part of the folding of the array of tubes to form the serpentine pathway, initially placing a portion of the initial linear pathway of the array of tubes, which becomes the lowest pass (16a, 16a', 16a") upon folding, on top of a sufficient number of transverse base members extending transversely under the portion of the linear pathway that becomes the lowest pass and aligned with the first tube sheet and at least some of the spacers, the transverse members being connected to longitudinal base members (44) to provide a supporting base frame subassembly;
(e)(2) attaching vertical supports (46) to and longitudinally spaced along the longitudinal base members, attaching intermediate longitudinal frame members to the vertical supports, and attaching an intermediate level of transverse support members to be located under at least some of the spacers to support an intermediate pass (16b, 16W, 16V, 16c, 16c', 16c") of the coil assembly, then folding the initial linear pathway of tubes to form the lowest pass and a pass above the lowest pass;
(e)(3) attaching to the vertical supports as many additional intermediate longitudinal frame members and transverse support members attached to the intermediate longitudinal frame members as necessary to support at least some of the spacers in additional passes, if any, and the top pass (16d, 16d', 16d") of the longitudinal array of tubes to form the serpentine pathway of the coil assembly, an intermediate transverse member supporting the second tube sheet attached to the ends of the tubes at the top pass, then folding the linear pathway of tubes to form the additional intermediate passes, if any, and the top pass, to be supported by the intermediate transverse support members and thereby form the serpentine pathway of the coil assembly; and
(e)(4) attaching upper longitudinal frame members (48) to the vertical supports and attaching at least two upper transverse frame members to the longitudinal upper frame members above the top pass to complete the frame and retain the coil assembly in a serpentine shape.

3. A method of making a coil assembly for use in heat exchange applications, the coil assembly (10, 10', 10") comprising:
an array (12, 12', 12") of polymeric tubes (14, 14', 14") extending from a first tube sheet (28, 28', 28") through a plurality of alignment holes (26) in a plurality of tube spacers (24, 24', 24") to a second tube sheet (28, 28', 28"), each tube in the array having a first end (17) and a second end (17);
the array of tubes extending from the first tube sheet to the second tube sheet along a serpentine pathway including at least two generally linear passes (16, 16', 16") extending for a predetermined longitudinal distance, where the array of tubes extends between the passes by way of one return bend (18, 18', 18") between each two passes;
the array of tubes in each pass comprising at least two generally parallel layers (20) of tubes;
the tubes maintaining their relative positional relationship to each other in the passes and in the return bends; and
the spacers being oriented transversely along the longitudinal distance of the passes; and
the spacers being of a sufficient number and spacing from each other along the longitudinal distance of the passes to support and maintain the tubes in their relative positional relationship in the passes and in the return bends;
the method comprising:
(a) providing the array of the polymeric tubes, the first and second tube sheets, and a plurality of the tube spacers, where the array of tubes is initially in an extended linear pathway;
(b) locating the tubes in the spacers such that the tubes are in the alignment holes in the spacers;
(c) aligning the tubes at the first end within the first tube sheet so that fluid can flow internally through the tubes;
(d) aligning the tubes at the second end within the second tube sheet so that fluid can flow internally through the tubes;
(e) folding the array of tubes from the initial extended linear pathway to form the serpentine pathway having the linear passes and at least one return bend, such that the relative positional relationship of the tubes with respect to each other is maintained in the passes and in the return bends; and
the method further comprising threading the tubes through the spacers and the tube sheets using a jig with mandrels (88, 92) aligned in a predetermined spacing corresponding to a desired orientation of the tubes within the array by extending the mandrels through the alignment holes and into ends (17) of the tubes, and retracting the tubes on the mandrels through the alignment holes in the spacers and tube sheets.

4. A method of making a coil assembly for use in heat exchange applications, the coil assembly (10, 10', 10") comprising:
an array (12, 12', 12") of polymeric tubes (14, 14', 14") extending from a first tube sheet (28, 28', 28") through a plurality of alignment holes (26) in a plurality of tube spacers (24, 24', 24") to a second tube sheet (28, 28', 28"), each tube in the array having a first end (15) and a second end (15);
the array of tubes extending from the first tube sheet to the second tube sheet along a serpentine pathway including at least two generally linear passes (16, 16', 16") extending for a predetermined longitudinal distance, where the array of tubes extends between the passes by way of one return bend (18, 18', 18") between each two passes;
the array of tubes in each pass comprising at least two generally parallel layers (20) of tubes;
the tubes maintaining their relative positional relationship to each other in the passes and in the return bends; and
the spacers being oriented transversely along the longitudinal distance of the passes; and
the spacers being of a sufficient number and spacing from each other along the longitudinal distance of the passes to support and maintain the tubes in their relative positional relationship in the passes and in the return bends;
the method comprising:
(a) providing the array of the polymeric tubes, the first and second tube sheets, and a plurality of the tube spacers, where the array of tubes is initially in an extended linear pathway;
(b) locating the tubes in the spacers such that the tubes are in the alignment holes in the spacers;
(c) aligning the tubes at the first end within the first tube sheet so that fluid can flow internally through the tubes;
(d) aligning the tubes at the second end within the second tube sheet so that fluid can flow internally through the tubes;
(e) folding the array of tubes from the initial extended linear pathway to form the serpentine pathway having the linear passes and at least one return bend, such that the relative positional relationship of the tubes with respect to each other is maintained in the passes and in the return bends; and
the method further comprising forming tube sheets around ends (17) of the tubes and forming the spacers around the tubes at spaced longitudinal locations intermediate the ends of the tubes, and wherein the tube sheet (28, 28', 28") is formed around the tubes (14, 14', 14") by an injection molding method comprising:
(f)(2) inserting mandrels (88, 92) into ends (17) of the tubes in the array (12, 12', 12") in a predetermined spacing corresponding to a desired orientation of the tubes within the tube sheet to form an injection moldable tube sheet layer of tubes, the injection moldable layer of tubes comprising one layer of the tubes in their relative positional relationship within the tube sheet layer if adjacent layers of the tubes are aligned in a generally perpendicular direction to the layer of tubes such that a first tube sheet layer (90) could only fit around one layer of tubes, or two layers (90, 94) of the tubes in their relative positional relationship within the array if adjacent layers of the tubes are staggered with respect to each other in a generally perpendicular direction to the layer of tubes such that a first tube sheet layer could fit around the two staggered layers of tubes and such that the injection mold could be removed from the injection moldable layer of tubes;
(g)(2) inserting an injection moldable layer of tubes on the mandrels through an injection mold (86) having a mold chamber (118);
(h)(2) injecting moldable material forming the tube sheets into the mold chamber of the injection mold;

(i)(2) curing the moldable material to form a tube sheet layer or two layers corresponding to the injection moldable layers (90, 94);

(j)(2) removing the mold from around the mold to provide the injection molded tube sheet layer with an embedded layer or two layers of tubes;

(k)(2) repeating (f)(2) through (j)(2) for the number of injection moldable layers of tubes in the array;

(l)(2) aligning and interconnecting the tube sheet layers in alignment to form the tube sheet.

5. The method of claim 4, wherein the injection mold (86) forms tube sheet (28, 28', 28") layers having a top surface and a bottom surface, the top surface having at least one projection (164) or depression (166), and the bottom surface having at least one depression (166) or projection (164) in locations corresponding in locations to the opposite of the projection or depression on the upper surface; the method further comprising aligning the tube sheet layers with their embedded tubes on top of each other with the projections and depressions in respective mating registry.

6. The method of claim 4, the method further comprising vibration welding of the tube sheet layers together to form an integral tube sheet (28, 28', 28").

7. The method of claim 4, wherein the alignment holes (26) and the mandrels have a generally oval cross-section such that the tubes (14, 14', 14") when retained in the tube sheet (28, 28', 28") have a major axis of the generally oval cross-section aligned generally vertically when the coil assembly (10, 10', 10") is in use.

8. The method of claim 4, wherein the tube sheets (28, 28', 28") and the spacers (24, 24', 24") are formed by one of casting or potting the tubes (14, 14', 14") in a curable composition.

9. The method of claim 4, wherein the tube sheet (28, 28', 28") or the spacer (24, 24', 24") is respectively formed by a casting or potting method by which tube end portions (15) are embedded within the tube sheet and the tube sheet is formed by a plurality of moldable tube sheet layers, or tubes (14, 14', 14") are embedded in the spacer (24) and the spacer is respectively formed by a plurality of moldable spacer layers (162), the method comprising:

(f)(3) providing a mold (122) having a bottom portion (124) and a top portion (126), the bottom and top portions together defining a mold chamber (127) by respective opposing side walls (130, 132) and opposing front and rear walls (134, 140) connected to a respective bottom wall (128) and a top wall (148), the front and rear walls of the bottom molding portion having upper edges (136, 142) and the front and rear walls of the top portion having lower edges (156), the mold chamber having a width sufficient respectively to embed tube end portions in the moldable tube sheet layer or to embed tubes in the moldable spacer layer (162), the width corresponding to a transverse distance of the pass (16, 16', 16") of the array (12, 12', 12") of tubes, the upper edges of the front and rear walls of the bottom portion of the mold having spaced lateral cavities (138, 144) with openings extending to a top of the upper edges at locations along the width of the mold chamber and the lower edges of the front and rear walls of the top portion of the mold having spaced lateral cavities (158) with openings extending to a bottom of the lower edges at locations along the width of the mold chamber, the locations of the cavities in the upper edges of the front and rear walls of the bottom portion of the mold and the locations of the cavities in the lower edges of the front and rear walls of the top portion of the mold (A) corresponding to locations of one layer of the tube end portions in their relative positional relationship respectively within the moldable tube sheet layer or within the moldable spacer layer corresponding to the relative positional relationship of the tubes within the array if adjacent layers of the tubes are aligned in a generally perpendicular direction to the layer of tubes such that the cavities of the mold could only fit around one layer of tubes, or (B) corresponding to locations of two layers of the tube end portions in their relative positional relationship respectively within the moldable tube sheet layer or within the moldable spacer layer corresponding to the relative positional relationship of the tubes within the array if adjacent layers of the tubes are staggered with respect to each other in a generally perpendicular direction to the layer of tubes such that a first moldable spacer layer could fit around the two staggered layers of tubes, wherein the tube sheet area corresponds to or is less than a transverse cross-sectional area of the respective number of tubes in the one or two areas of the array of the tubes in the pass that are within the tube sheet moldable layer;

(g)(3) locating the respective tube end portions for a moldable tube sheet layer or the tubes for a moldable spacer layer within the cavities formed in the upper edges of the front and rear walls of the bottom portion of the mold;

(h)(3) closing the mold around the respective tube ends or tubes so as to register with the cavities formed in the lower edges of the front and rear walls of the top portion of the mold;

(i)(3) sealing the mold around the respective tube ends or tubes and where the top portion joins the bottom portion;

(j)(3) pouring casting or potting material into the mold;

(k)(3) curing the casting or potting material to form the respective moldable tube sheet layer or the moldable spacer layer;

(l)(3) removing the mold from the respective moldable tube sheet layer or the moldable spacer layer;

(m)(3) repeating (f)(3) through (l)(3) for the number of the respective moldable layers of tubes end portions or tubes in the array; and (n)(3) locating and interconnecting the respective moldable tube sheet layers in alignment to form the tube sheet or the moldable spacer layers to form the spacer.

10. The method of claim 9, wherein the mold forms respective tube sheet (28, 28', 28") layers or spacer (24, 24', 24") layers having a top surface and a bottom surface, the top surface having at least one projection (164) or depression (166), and the bottom surface having at least one depression (166) or projection (164) in locations corresponding in locations to the opposite of the projection or depression on the upper surface; the method further comprising aligning the respective tube sheet layers with their embedded tube end portions on top of each other with the projections and depressions in respective mating registry or the spacer layers with their embedded tubes (14, 14', 14") on top of each other with the projections and depressions in respective mating registry.

11. The method of claim 9, the method further comprising vibration welding of the tube sheet layers together to form an integral tube sheet (28, 28', 28").

12. A method of making a coil assembly for use in heat exchange applications, the coil assembly (10, 10', 10") comprising an array (12, 12', 12") of polymeric tubes (14, 14', 14") extending from a first tube sheet (28, 28', 28")

through a plurality of alignment holes (26) in a plurality of tube spacers (24, 24', 24") to a second tube sheet (28, 28', 28"), each tube in the array having a first end (17) and a second end (17), the array of tubes comprising at least two generally parallel layers (20) of tubes, the spacers being oriented transversely along a longitudinal distance between the first and second tube sheets, the spacers being of a sufficient number and spacing from each other along a longitudinal distance between the tube sheets;

the method comprising:
(a)(5) providing the array of the polymeric tubes, the first and second tube sheets, and a plurality of the tube spacers;
(b)(5) locating the tubes in the spacers such that the tubes are in the alignment holes in the spacers;
(c)(5) aligning the tubes at the first ends within the first tube sheet so that fluid can flow internally through the tubes;
(d)(5) aligning the tubes at the second ends within the second tube sheet so that fluid can flow internally through the tubes; and
(e)(5) forming tube sheets around the ends of the tubes by injection molding, casting or potting;
wherein the tube sheet is formed around the tubes by an injection molding method comprising:
(f)(5) inserting mandrels (88, 92) into ends (17) of the tubes in the array (12, 12', 12") in a predetermined spacing corresponding to a desired orientation of the tubes within the tube sheet to form an injection moldable tube sheet layer of tubes, the injection moldable layer of tubes comprising one layer of the tubes in a relative positional relationship within the tube sheet layer if adjacent layers of the tubes are aligned in a generally perpendicular direction to the layer of tubes such that a first tube sheet layer (90) could only fit around one layer of tubes, or two layers (90, 94) of the tubes in a relative positional relationship within the array if adjacent layers of the tubes are staggered with respect to each other in a generally perpendicular direction to the layer of tubes such that a first tube sheet layer could fit around the two staggered layers of tubes and such that the injection mold could be removed from the injection moldable layer of tubes;
(g)(5) inserting an injection moldable layer of tubes on the mandrels through an injection mold (86) having a mold chamber (118);
(h)(5) injecting moldable material forming the tube sheets into the mold chamber of the injection mold;
(i)(5) curing the moldable material to form a tube sheet layer or two layers corresponding to the injection moldable layers (90, 94);
(j)(5) removing the mold from around the mold to provide the injection molded tube sheet layer with an embedded layer or two layers of tubes;
(k)(5) repeating (f)(5) through (j)(5) for the number of injection moldable layers of tubes in the array;
(l)(5) locating and interconnecting the tube sheet layers in alignment to form the tube sheet.

13. The method of claim 12, wherein the injection mold (86) forms tube sheet (28, 28', 28") layers having a top surface and a bottom surface, the top surface having at least one projection (164) or depression (166), and the bottom surface having at least one depression (166) or projection (164) in locations corresponding in locations to the opposite of the projection or depression on the upper surface; the method further comprising aligning the tube sheet layers with their embedded tubes (14, 14', 14") on top of each other with the projections and depressions in respective mating registry.

14. The method of claim 12, the method further comprising vibration welding of the tube sheet layers together to form an integral tube sheet (28, 28', 28").

15. The method of claim 12, wherein the alignment holes (26) and the mandrels (88, 92) have a generally oval cross-section such that the tubes (14, 14', 14") when retained in the tube sheet (28, 28', 28") have a major axis of the generally oval cross-section aligned generally vertically when the coil assembly is in use.

16. A method of making a coil assembly for use in heat exchange applications, the coil assembly (10, 10', 10") comprising an array (12, 12', 12") of polymeric tubes (14, 14', 14") extending from a first tube sheet (28, 28', 28") through a plurality of alignment holes in a plurality of tube spacers (24, 24', 24") to a second tube sheet (28, 28', 28"), each tube in the array having a first end (17) and a second end (17), the array of tubes comprising at least two generally parallel layers (20) of tubes, the spacers being oriented transversely along a longitudinal distance between the first and second tube sheets, the spacers being of a sufficient number and spacing from each other along a longitudinal distance between the tube sheets;

the method comprising:
(a)(5) providing the array of the polymeric tubes, the first and second tube sheets, and a plurality of the tube spacers;
(b)(5) locating the tubes in the spacers such that the tubes are in the alignment holes in the spacers;
(c)(5) aligning the tubes at the first ends within the first tube sheet so that fluid can flow internally through the tubes;
(d)(5) aligning the tubes at the second ends within the second tube sheet so that fluid can flow internally through the tubes; and
(e)(5) forming tube sheets around the ends of the tubes by injection molding, casting or potting;
wherein the tube sheets and the spacers are formed by one of casting or potting the tubes in a curable composition, wherein the tube sheet (28, 28', 28") or the spacer (24, 24', 24") is respectively formed by a casting or potting method by which tube end portions (15) are embedded within the tube sheet and the tube sheet is formed by a plurality of moldable tube sheet layers, or tubes (14, 14', 14") are embedded in the spacer and the spacer is respectively formed by a plurality of moldable spacer layers (162), the method comprising:
(f)(6) providing a mold (122) having a bottom portion (124) and a top portion (126), the bottom and top portions together defining a mold chamber (127) by respective opposing side walls (130, 132) and opposing front and rear walls (134, 140) connected to a respective bottom wall (128) and a top wall (148), the front and rear walls of the bottom molding portion having upper edges (136, 142) and the front and rear walls of the top portion having lower edges (156), the mold chamber having a width sufficient respectively to embed tube end portions in the moldable tube sheet layer or to embed tubes in the moldable spacer layer (162), the width corresponding to a transverse distance of the pass (16, 16', 16") of the array (12, 12', 12") of tubes, the upper edges of the front and rear walls of the bottom portion of the mold having spaced lateral cavities (138, 144)

with openings extending to a top of the upper edges at locations along the width of the mold chamber and the lower edges of the front and rear walls of the top portion of the mold having spaced lateral cavities (158) with openings extending to a bottom of the lower edges at locations along the width of the mold chamber, the locations of the cavities in the upper edges of the front and rear walls of the bottom portion of the mold and the locations of the cavities in the lower edges of the front and rear walls of the top portion of the mold (A) corresponding to locations of one layer of the tube end portions in a relative positional relationship respectively within the moldable tube sheet layer or within the moldable spacer layer corresponding to a relative positional relationship of the tubes within the array if adjacent layers of the tubes are aligned in a generally perpendicular direction to the layer of tubes such that the cavities of the mold could only fit around one layer of tubes, or (B) corresponding to locations of two layers of the tube end portions in a relative positional relationship respectively within the moldable tube sheet layer or within the moldable spacer layer corresponding to a relative positional relationship of the tubes within the array if adjacent layers of the tubes are staggered with respect to each other in a generally perpendicular direction to the layer of tubes such that a first moldable spacer layer could fit around the two staggered layers of tubes, wherein the tube sheet area corresponds to or is less than a transverse cross-sectional area of the respective number of tubes in the one or two areas of the array of the tubes in the pass that are within the tube sheet moldable layer;

(g)(6) locating the respective tube end portions for a moldable tube sheet layer or the tubes for a moldable spacer layer (162) within the cavities formed in the upper edges of the front and rear walls of the bottom portion of the mold;

(h)(6) closing the mold around the respective tube ends or tubes so as to register with the cavities formed in the lower edges of the front and rear walls of the top portion of the mold;

(i)(6) sealing the mold around the respective tube ends or tubes and where the top portion joins the bottom portion;

(j)(6) pouring casting or potting material into the mold;

(k)(6) curing the casting or potting material to form the respective moldable tube sheet layer or the moldable spacer layer;

(l)(6) removing the mold from the respective moldable tube sheet layer or the moldable spacer layer;

(m)(6) repeating (f)(6) through (l)(6) for the number of the respective moldable layers of tubes end portions or tubes in the array; and (n)(6) locating and interconnecting the respective moldable tube sheet layers in alignment to form the tube sheet or the moldable spacer layers to form the spacer.

17. The method of claim 16, wherein the mold (122) forms respective tube sheet (28, 28', 28") layers or spacer (24, 24', 24") layers having a top surface and a bottom surface, the top surface having at least one projection (164) or depression (166), and the bottom surface having at least one depression (166) or projection (164) in locations corresponding in locations to the opposite of the projection or depression on the upper surface; the method further comprising aligning the respective tube sheet layers with their embedded tube end portions on top of each other with the projections and depressions in respective mating registry or the spacer layers (162) with their embedded tubes (14, 14', 14") on top of each other with the projections and depressions in respective mating registry.

18. The method of claim 16, the method further comprising vibration welding of the tube sheet layers together to form an integral tube sheet (28, 28', 28").

\* \* \* \* \*